(12) United States Patent
Bhatt

(10) Patent No.: US 9,336,240 B2
(45) Date of Patent: May 10, 2016

(54) GEO-TAGGING DIGITAL IMAGES

(75) Inventor: Nikhil Bhatt, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 692 days.

(21) Appl. No.: 13/184,277

(22) Filed: Jul. 15, 2011

(65) Prior Publication Data

US 2013/0018881 A1    Jan. 17, 2013

(51) Int. Cl.
*G06F 7/00*  (2006.01)
*G06F 17/30* (2006.01)

(52) U.S. Cl.
CPC .... *G06F 17/30268* (2013.01); *G06F 17/30241* (2013.01); *G06F 17/30265* (2013.01)

(58) Field of Classification Search
None
See application file for complete search history.

(56) References Cited

U.S. PATENT DOCUMENTS

| | | |
|---|---|---|
| 5,812,128 A | 9/1998 | Sterling |
| 5,818,437 A | 10/1998 | Grover et al. |
| 5,880,722 A | 3/1999 | Brewer et al. |
| 6,018,774 A | 1/2000 | Mayle et al. |
| 6,160,553 A | 12/2000 | Robertson et al. |
| 6,249,316 B1 | 6/2001 | Anderson |
| 6,282,362 B1 * | 8/2001 | Murphy et al. ............ 386/224 |
| 6,374,260 B1 | 4/2002 | Hoffert et al. |
| 6,408,301 B1 | 6/2002 | Patton et al. |
| 6,437,797 B1 | 8/2002 | Ota |
| 6,490,370 B1 | 12/2002 | Krasinski et al. |
| 6,542,936 B1 | 4/2003 | Mayle et al. |
| 6,545,687 B2 | 4/2003 | Scott et al. |
| 6,700,612 B1 | 3/2004 | Anderson et al. |
| 6,734,909 B1 | 5/2004 | Terane et al. |
| 6,871,231 B2 | 3/2005 | Morris |
| 6,904,160 B2 | 6/2005 | Burgess |
| 6,912,327 B1 | 6/2005 | Hori et al. |

(Continued)

FOREIGN PATENT DOCUMENTS

| | | |
|---|---|---|
| EP | 576030 | 11/1998 |
| EP | 1283482 | 2/2003 |

(Continued)

OTHER PUBLICATIONS

Tsai et al., "Extent: Inferring Image Metadata From Context and Content", Department of Electrical & Computer Engineering and Computer Science, UC Santa Barbara, IEEE 2005, 4 pages.

(Continued)

*Primary Examiner* — Debbie Le
*Assistant Examiner* — Hasanul Mobin
(74) *Attorney, Agent, or Firm* — Blank Rome LLP

(57) ABSTRACT

Methods, systems, and apparatus, including computer programs encoded on computer storage media, are described for automatically and/or interactively editing image metadata. In one aspect, the methods include the actions of obtaining two from among three items of geo-metadata associated with an image. The three items of geo-metadata include an acquisition geo-location for the image, an acquisition geo-orientation for the image and a geo-location of a subject depicted in the image. The methods further include the actions of representing on a map the two obtained items of geo-metadata associated with the image, and determining candidates for the third item of geo-metadata based on the representations of the two obtained items of geo-metadata. In addition, the methods can also include the actions of determining the third item of geo-metadata associated with the image from among the generated candidates.

17 Claims, 13 Drawing Sheets

(56) References Cited

U.S. PATENT DOCUMENTS

| | | |
|---|---|---|
| 6,919,910 B2 | 7/2005 | Chang |
| 6,950,662 B2 | 9/2005 | Kumar |
| 7,020,848 B2 | 3/2006 | Rosenzweig et al. |
| 7,146,576 B2 | 12/2006 | Chang et al. |
| 7,162,488 B2 | 1/2007 | DeVorchik et al. |
| 7,243,101 B2 | 7/2007 | Itou |
| 7,437,005 B2 | 10/2008 | Drucker et al. |
| 7,707,517 B2 | 4/2010 | Bier et al. |
| 8,233,741 B1* | 7/2012 | Wilson ............... G06T 5/006 382/100 |
| 8,508,830 B1* | 8/2013 | Wang ............... G02B 3/0006 359/267 |
| 8,577,166 B1* | 11/2013 | Ferguson ........... G06F 17/3089 382/255 |
| 2001/0022621 A1 | 9/2001 | Squibbs |
| 2002/0000998 A1 | 1/2002 | Scott et al. |
| 2002/0051262 A1 | 5/2002 | Nuttall et al. |
| 2002/0107973 A1 | 8/2002 | Lennon et al. |
| 2002/0109728 A1 | 8/2002 | Tiongson et al. |
| 2002/0143762 A1 | 10/2002 | Boyd et al. |
| 2003/0076322 A1 | 4/2003 | Ouzts et al. |
| 2003/0084087 A1 | 5/2003 | Berry |
| 2003/0122839 A1 | 7/2003 | Matraszek et al. |
| 2004/0201702 A1 | 10/2004 | White |
| 2004/0205633 A1 | 10/2004 | Martinez et al. |
| 2004/0218894 A1 | 11/2004 | Harville et al. |
| 2004/0247176 A1* | 12/2004 | Aucsmith ............ G06K 9/38 382/154 |
| 2005/0063613 A1 | 3/2005 | Casey et al. |
| 2005/0078174 A1 | 4/2005 | Casey et al. |
| 2005/0091596 A1 | 4/2005 | Anthony et al. |
| 2005/0091612 A1 | 4/2005 | Stabb et al. |
| 2005/0104976 A1 | 5/2005 | Currans |
| 2005/0108620 A1 | 5/2005 | Allyn et al. |
| 2005/0165523 A1 | 7/2005 | Nakazawa |
| 2005/0165543 A1 | 7/2005 | Yokota |
| 2006/0001757 A1 | 1/2006 | Sawachi |
| 2006/0044401 A1 | 3/2006 | Park |
| 2006/0066752 A1 | 3/2006 | Kelliher |
| 2006/0090359 A1 | 5/2006 | Bork |
| 2006/0114336 A1 | 6/2006 | Liu |
| 2006/0114338 A1 | 6/2006 | Rothschild |
| 2006/0155761 A1 | 7/2006 | Van et al. |
| 2006/0187317 A1 | 8/2006 | Monlulli et al. |
| 2006/0224993 A1 | 10/2006 | Wong et al. |
| 2006/0251339 A1 | 11/2006 | Gokturk et al. |
| 2007/0058932 A1 | 3/2007 | Wafler |
| 2007/0098266 A1 | 5/2007 | Chiu et al. |
| 2007/0112852 A1 | 5/2007 | Sorvari et al. |
| 2007/0115373 A1 | 5/2007 | Gallagher et al. |
| 2007/0127833 A1 | 6/2007 | Singh |
| 2007/0188626 A1 | 8/2007 | Squilla et al. |
| 2007/0189333 A1 | 8/2007 | Naaman |
| 2007/0223878 A1 | 9/2007 | Abe et al. |
| 2008/0037826 A1 | 2/2008 | Sundstrom et al. |
| 2008/0069404 A1 | 3/2008 | Lee et al. |
| 2008/0069449 A1 | 3/2008 | Cho et al. |
| 2008/0104019 A1 | 5/2008 | Nath |
| 2008/0104099 A1 | 5/2008 | Walczak et al. |
| 2008/0148152 A1 | 6/2008 | Blinnikka et al. |
| 2008/0170781 A1 | 7/2008 | Woolgar |
| 2008/0174676 A1 | 7/2008 | Squilla et al. |
| 2008/0304808 A1 | 12/2008 | Newell et al. |
| 2009/0010491 A1 | 1/2009 | Ko et al. |
| 2009/0031246 A1 | 1/2009 | Cowtan et al. |
| 2009/0135274 A1 | 5/2009 | Kim et al. |
| 2009/0324058 A1 | 12/2009 | Sandage et al. |
| 2009/0327229 A1 | 12/2009 | O'Connor et al. |
| 2010/0020222 A1* | 1/2010 | Jones et al. ............ 348/333.02 |
| 2010/0080551 A1 | 4/2010 | Chen et al. |
| 2010/0110178 A1* | 5/2010 | Isobe ............... G02B 7/36 348/135 |
| 2010/0149399 A1 | 6/2010 | Mukai |
| 2010/0165177 A1* | 7/2010 | Liaw ............... H04N 5/23212 348/349 |
| 2010/0284566 A1 | 11/2010 | Hisatomi et al. |
| 2011/0052073 A1 | 3/2011 | Wallace et al. |
| 2011/0064312 A1 | 3/2011 | Janky et al. |
| 2011/0129120 A1* | 6/2011 | Chan ............... 382/103 |
| 2012/0229657 A1* | 9/2012 | Calman ............... G06Q 50/01 348/207.1 |
| 2013/0155204 A1* | 6/2013 | Kokubun ............... G03B 35/02 348/49 |

FOREIGN PATENT DOCUMENTS

| | | |
|---|---|---|
| EP | 1566752 | 3/2006 |
| EP | 1729263 | 12/2006 |
| JP | 9027937 | 1/1997 |
| JP | 2002259410 | 9/2002 |
| JP | 2006145629 A * | 6/2006 |
| JP | 2008131330 | 6/2008 |
| JP | 2008146191 | 6/2008 |
| WO | 0175645 | 10/2001 |
| WO | 2005001658 | 1/2005 |
| WO | 2005001714 | 1/2005 |
| WO | 2008079750 | 10/2008 |

OTHER PUBLICATIONS

Wang et al., "Method and Apparatus for Geo-named Object Identification", IP.com Prior Art Database, IPCOM000134145D, Feb. 24, 2006, 8 pages.

International Search Report and Written Opinion for Patent Application No. PCT/US2012/046754, dated Sep. 28, 2012, 10 Pages.

"Naaman et al., ""Automatically Generating Metadata for Digital Photographs with GeographicCoordinates""", May 17-22, 2004, pp. 244-245".

"IBM, ""Camera Attitude Recorder""", w\\iw.ip.c:om, IP.com No. IPCOM000154729D, Jul. 13, 2007".

"Amundsen, ""Using the Geographical Location of Photos in Mobile Phones""", Norwegian university of Science and Technology, Department of computer and Information Science, Master of Science inComputer Science, Jul. 2008".

Notification of Transmittal of the International Search Report and the Written Opinion of the International Searching Authority for International Application No. PCT/US2008/056656, filed Mar. 12, 2008, mailed Aug. 1, 2008. Published by the European Patent Office.

Hewagamage, K.P. et al., "Augmented Album: situation-dependent system for a personal digital video/image collection"; Multimedia and Expo, 2000. ICME 2000. 2000 IEEE International Conference on New York, NY, USA, Jul. 30-Aug. 2, 2000, Piscataway, NJ, USA, IEEE, US, vol. 1, Jul. 30, 2000, pp. 323-326.

Brian K. Smith et al., Inquiry with imagery: historical archive retrieval with digital cameras, Proeedings of the seventh ACM international conference on Multimedia (Part 1), p. 405-408, Oct. 3D-Nov. 5, 1999, Orlando, Florida, US.

O'Hare et al., My digital photos: where and when?, ACM Multimedia 2005—13th ACM International Conference on Multimedia 2005, Nov. 6-12, 2005, Singapore.

Sony GPS tracker for photographers, Aug. 2, 2006, 4 [pgs.

U.S. Non-Final Office Action for U.S. Appl. No. 111685,672 dated Jan. 25, 2011 (13 pages).

Chinese Notification of the First Office Action (with English translation) for Application No. 200780051294.9 dated Feb. 6, 2012, 9 pages.

U.S. Non-Final Office Action for U.S. Appl. No. 11/760,684 dated Jun. 23, 2011 (15 pages).

U.S. Final Office Action for U.S. Appl. No. 111760,684 dated Dec. 8, 2010 (20 pages).

U.S. Non-Final Office Action for U.S. Appl. No. 11/760,684 dated Mar. 8, 2010 (17 pages).

U.S. Final Office Action for U.S. Appl. No. 111685.672 dated Nov. 4, 2011 (13 pages).

U.S. Final Office Action for U.S. Appl. No. 111760.684 dated Mar. 7, 2012 (14 pages).

Adelman, Kenneth and Gabrielle, "California Coastal Records Project," Photography and website, [online], Copyright © 2002-2005

(56) References Cited

OTHER PUBLICATIONS

Kenneth & Gabrielle Adelman—Adelman@Adelman.com, <http://www.californiacoastline.org>, retrieved Apr. 11, 2008, pp. 1-4.
International Search Report and Written Opinion of the International Searching Authority for International Application No. PCT/US2007/087660 published by the European Patent Office, filed Dec. 14, 2007, mailed Jul. 30, 2008, 25 pages.
Anonymous: "Indexing and Recall of Capture Events", Research Disclosure, Mason Publication, Hampshire, GB, vol. 422, No. 66, Jun. 1, 1999, XP007124469 ISSN: 0374-4353, 1 page.
Adelman, Kenneth & Gabrielle, California Coastal Protection Network, California Coastal Records Project—Aerial Photographs of the California Coastline, [online], Copyright © 2002-2006 Kenneth & Gabrielle Adelman, <http://www.californiacoastline.org/>, retrieved Jul. 5, 2007, 1 page.
IBM, "Digital Camera with Global Positioning Satellite to Record Location with Image", IBM Technical Disclosure, XP-002522567, article No. 413126, Sep. 1, 1998, 1 page.
"O'Hare et al., My Digital Photos: Where and When?, ACM Multimedia 2005—13th ACM International Conference on Multimedia 2005, Nov. 6-11, 2005, Singapore, pp. 261-262".
Sony GPS tracker for photographers, Digital Photography Review, [online], Aug. 2, 2006,<http:www.dpreview.comlnews/2006/08/02/sonygpscs1/print>, retrieved Jun. 4, 2012, pp. 1-2.
IBM TDB and Cato, RT; "Digital Camera with Global Positioning Satellite to Record Location with Image," Research Disclosure, vol. 41, No. 413, Sep. 1, 1998, XP002522567 Havant, UK, article No. 413126, 2 pages.
International Search Report and Written Opinion of the International Searching Authority for International Application No. PCT/US2008/056656 published by the European Patent Office, filed Mar. 12, 2008, mailed Aug. 1, 2008, 18 pages.

\* cited by examiner

GEO-TAGGING DIGITAL IMAGES

BACKGROUND

This specification relates to geo-tagging digital images, for example, depicting landmarks, points of interest and the like. For example, metadata can be associated with a digital image such that the associated metadata includes a geographical location and an orientation of a camera that acquired the image, as well as a geographical location of the image's subject.

Images such as digital photos can contain a vast amount of visual information including potentially multiple objects in the foreground and different objects in the background or otherwise further away. However, the visual information typically does not convey many of the details associated with capturing the image. Therefore, text-based image metadata can be recorded and stored along with an image, such as in an image file header. Image metadata is structured data that describes characteristics of an associated image.

SUMMARY

Technologies described in this specification can be used to automatically and/or interactively edit image metadata. For example, an existing metadata item can be altered or deleted if it is incorrect. Further, new metadata can be appended to the metadata associated with an image file. Thus, metadata that was not available to the image capture device at the time of capture nonetheless can be determined and associated with the image.

In general, one aspect of the subject matter described in this specification can be implemented in methods that include the actions of obtaining two from among three items of geo-metadata associated with an image. The three items of geo-metadata include an acquisition geo-location for the image, an acquisition geo-orientation for the image and a geo-location of a subject depicted in the image. The methods further include the actions of representing on a map the two obtained items of geo-metadata associated with the image, and determining candidates for the third item of geo-metadata based on the representations of the two obtained items of geo-metadata. In addition, the methods can also include the actions of determining the third item of geo-metadata associated with the image from among the generated candidates.

Other implementations of this aspect include corresponding computer systems, apparatus, and computer programs recorded on one or more computer storage devices, each configured to perform the actions of the methods. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other implementations can each optionally include one or more of the following features, alone or in combination. In some implementations, the two obtained items of geo-metadata associated with the image can be the acquisition geo-location and the acquisition geo-orientation. In this case, representing on the map the obtained acquisition geo-location and geo-orientation can include overlaying on the map a vector having an origin at the obtained acquisition geo-location and a direction corresponding to the obtained acquisition geo-orientation. Further, determining the candidates of the geo-location of the subject depicted in the image can include identifying along the direction of the vector one or more objectives of interest based on geo-information that includes polygonal contours corresponding to objectives of interest. In addition, determining which of the one or more identified objectives of interest is the subject in the image is performed at least in part based on predetermined criteria. For example, the predetermined criteria can include user selection, such that determining the subject in the image from among the one or more identified objectives of interest is performed based on the user selection. As another example, the predetermined criteria can include a specified range, such that determining the subject in the image can include selecting an objective from among the one or more identified objectives that is located within the specified range from the acquisition geo-location.

In some implementations, determining the candidates of the geo-location of the subject depicted in the image can include receiving a user request to identify an objective of interest along the direction of the overlaid vector, and in response to the received user request, extending a length of the overlaid vector. In addition, determining the candidates of the geo-location of the subject include performing the identification of the objective of interest when the extended vector reaches a polygonal contour of the objective of interest. In some instances, reaching of the polygonal contour occurs when the extended vector intersects the polygonal contour. In other instances, reaching the polygonal contour occurs when the extended vector is separated from the polygonal contour by less than a predetermined distance. Moreover, receiving the user request to identify objectives of interest along the direction of the overlaid vector can include detecting a touch gesture extending the length of the overlaid vector. In some implementations, the methods can include the actions of generating focus distance metadata as the length of the overlaid vector representing the acquisition geo-orientation. In some implementations, the methods can include the actions of tagging the image in accordance with hierarchical geo-location information associated with the determined subject.

In some implementations, the image can be a frame that is part of a sequence of video frames. For example, the sequence of video frames can be a video clip. As such, the methods can include the actions of associating the determined subject of the frame with the sequence of the video frames as a (first) subject of the sequence of the video frames. Additionally, the methods can include the actions of obtaining an acquisition geo-location and an acquisition geo-orientation of another frame of the sequence of the video frames, then representing on the map the obtained acquisition geo-location and geo-orientation of the other frame at least in part by overlaying on the map another vector having an origin at the obtained acquisition geo-location of the other frame and a direction corresponding to the obtained acquisition geo-orientation of the other frame. The methods can further include identifying along the direction of the other vector one or more other objectives of interest based on geo-information including polygonal contours corresponding to other objectives of interest, and determining, at least in part based on the predetermined criteria used to determine the (first) subject of the sequence of the video frames, which of the one or more other identified objectives of interest is the subject in the other frame. Additionally, the methods can include the actions of associating the determined subject of the other frame with the sequence of the video frames as another (second) subject of the sequence of the video frames.

In some implementations, the two obtained items of geo-metadata associated with the image can be the acquisition geo-location for the image and the geo-location of the subject depicted in the image. Further, representing on the map the obtained acquisition geo-location and the geo-location of the subject depicted in the image can include overlaying on the map a first point corresponding to the obtained acquisition geo-location and a polygonal contour corresponding to the obtained geo-location of the subject depicted in the image.

In some cases, determining the candidates of the acquisition geo-orientation can include overlaying on the map a vector having an origin at the obtained acquisition geo-location and a length corresponding to a focus distance recorded by a camera that acquired the image, and scanning an angular range containing the polygonal contour corresponding to the subject depicted in the image by rotating the overlaid vector around the origin. In addition, determining the acquisition orientation from among the determined candidates can include receiving a user request to point the overlaid vector in a direction within the scanned angular range, pointing the overlaid vector in the direction requested by the user, and generating a value of the acquisition geo-orientation as an angle of the direction of the overlaid vector. In these cases, rotating the overlaid vector around the origin can be performed in response to receiving a user request to rotate the overlaid vector, and receiving the user request to rotate the overlaid vector can include detecting a touch gesture rotating the overlaid vector.

In other cases, determining the candidates of the acquisition geo-orientation can include overlaying on the map a vector having an origin at the obtained acquisition geo-location, and determining a direction from the origin of the overlaid vector to leftmost point of the polygonal contour visible in the image, and a direction from the origin of the overlaid vector to rightmost point of the polygonal contour visible in the image. In these cases, determining the acquisition orientation from among the determined candidates can include pointing the overlaid vector in a direction corresponding to a mean of the determined directions from the origin of the overlaid vector to the determined leftmost and rightmost points of the polygonal contour visible in the image, and generating a value of the acquisition geo-orientation as an angle of the direction of the overlaid vector.

In some instances, the polygonal contour corresponding to the obtained geo-location of the subject depicted in the image can collapse to one point. In such cases, the methods can include the actions of extending the length of the overlaid vector representing the acquisition geo-orientation from the obtained acquisition geo-location to the obtained geo-location of the subject depicted in the image, and generating actual focus distance metadata as the length of the overlaid vector representing the acquisition geo-orientation. Further, the methods can include the actions of receiving a user request to extend the length of the overlaid vector at least in part by detecting a touch gesture extending the length of the overlaid vector.

Particular implementations of the subject matter described in this specification can be configured so as to realize one or more of the following potential advantages. The disclosed technologies can be used to curate metadata associated with an image. For example, the technologies described in this specification can be used to identify a subject depicted in an image based on known geo-location and geo-orientation of the camera that acquired the image. In this manner, images can be classified in accordance with the identity and/or location of the image's subject, and hence, organized and/or searched based on such classification.

As another example, the described technologies can be used to determine/correct acquisition geo-orientation of the camera that acquired an image based on known geo-location of the camera that acquired the image and on a geo-location of the subject depicted in the image. In addition, a user can add compass heading information to the image metadata. Once the acquisition geo-orientation has been determined/corrected by the disclosed system or entered by the user, images can be auto-classified, e.g., as eastward-facing images, northward-facing images, etc., and organized and/or searched accordingly.

As yet another example, the subject matter described in this specification can be used to determine/correct a focus distance for the camera that acquired an image based on a known geo-location of the camera that acquired the image and on a geo-location of the subject depicted in the image. In addition, a user can add metadata corresponding to distance from camera to subject, either as a single value, or a start/end pair of values. Once the focus distance has been determined/corrected by the disclosed system or entered by the user, images can be auto-classified as close-up shots, intermediate-distant shots and distant-shots, then organized and searched based on this classification.

In addition, the technologies described in this specification allow for classifying images based on multiple subject locations. The multiple subject locations can be equivalent or one or more of the multiple locations can be primary, and the other of the multiple locations can be secondary or tertiary. For example, an image can be classified as an image of both Marin County and the Golden Gate Bridge, and San Francisco.

Details of one or more implementations of the disclosed subject matter are set forth in the accompanying drawings and the description below. Other features, aspects, and potential advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
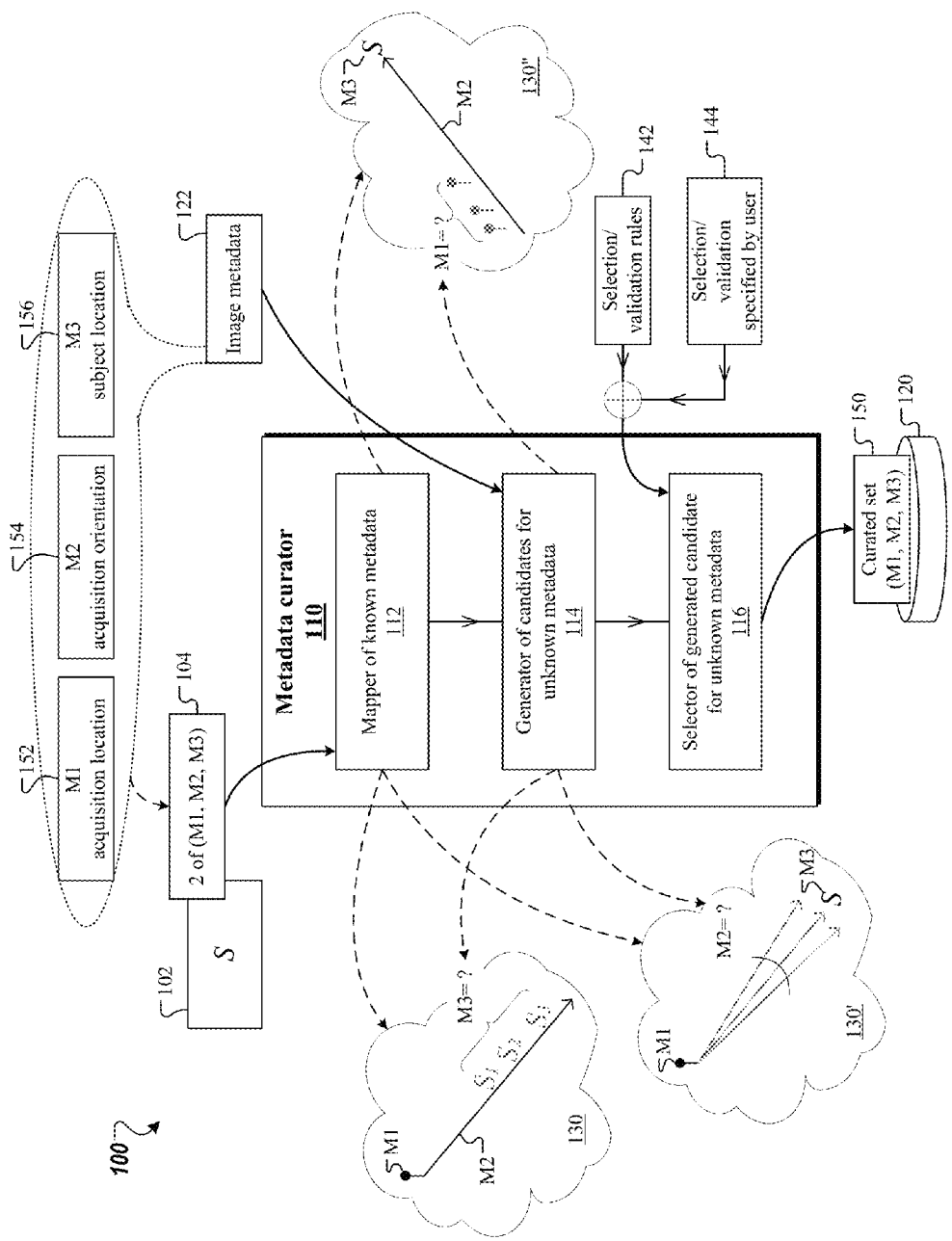
FIG. 1 illustrates an example of a system that is used to curate metadata associated with an image.

FIG. 1 illustrates an example of a system 100 that is used to curate metadata associated with an image. The system 100 can be implemented as part of an image processing application executed by a computer system. The system 100 can include a user interface that provides controls and indicators used by a user associated with the image processing application to view one or more images and/or their corresponding image metadata, and to specify how to modify and/or manage the same.

When an image is captured, image metadata 122 related to an image 102 also can be captured by the image capture device. The captured image metadata 122 can include generic information as well as camera-manufacturer specific information. Each item of metadata describes a particular characteristic associated with the image 102. A metadata item can describe essentially any objective characteristic associated with the captured image 102. For example, metadata items can include the time and date of capture, the geographical location of capture 152, dimensions of the image, and one or more technical settings or values relating to the image capture device. Once the image metadata 122 has been generated and stored in association with an image 102, the metadata 122 remains associated with that image 122. For example, the image metadata 122 can be transferred or copied when the corresponding image is transferred or copied. Typically, image metadata 122 is text-based, it can be used to identify and manage images. In some instances, the image metadata 122 can be organized hierarchically, so that one or more items of metadata are categorized under one or more other items. In other instances, image metadata 122 can be organized using a single-level list of related and/or unrelated metadata items.

The system 100 can also include a plurality of utilities that carry out under-the-hood processing to generate the specified views, to modify the selected image(s) and/or their corresponding image metadata, and to manage the modified image(s) and/or their corresponding image metadata. The plurality of utilities associated with the system 100 can include a metadata curator utility 110 used to fix incorrect metadata items of image metadata associated with a digital image or to add one or more metadata item(s) if the latter is missing from the image metadata. The digital image 102 may depict a subject "S". For example, image metadata 122 associated with an image 102 can include a metadata item M1 relating to the acquisition location 152. As another example, the image metadata 122 associated with the image 102 can include another metadata item M2 relating to the acquisition orientation 154. As yet another example, the image metadata 122 associated with the image 102 can include yet another metadata item M3 relating to a location 156 of the subject S depicted in the digital image 102. The metadata curator utility 110 can receive an incomplete (or incorrect) subset of metadata items 104 that has two (correct) items out of the three metadata items M1, M2 and M3 and is configured to determine the missing (or incorrect) item of metadata and to output a curated set of metadata items 150 that has all three (correct) metadata items M1, M2 and M3.

In general, an incomplete set of metadata items 104 (that contains two out of the three metadata items M1, M2 and M3 described above) is processed by various modules of the metadata curator utility 110. In FIG. 1, these various modules include a mapper of known metadata items 112, a generator of candidates for the unknown metadata item 114, and a selector of one of the generated candidates for the unknown metadata item 116. A curated set of metadata items 150 (that contains all three metadata items M1, M2 and M3) can be output by the metadata curator utility 110 and stored by the system 100 in a data repository 120. The image metadata 122, now including the curated set of metadata items 150, also may be stored in the same data repository 120.

The metadata curator utility 110 accesses the incomplete set of metadata items 104 associated with the digital image 102 that depicts subject S. The mapper 112 determines which two out of the three metadata items M1, M2 and M3 are known in the accessed incomplete set 104, and then represents on a map the known metadata items. In some implementations, when the mapper 112 finds that one of the three metadata items M1, M2 and M3 is missing (e.g., its corresponding data field has a null value), then the mapper 112 deems the existing other two items (e.g., corresponding to data fields that have non-null values) to be the known metadata items of the accessed incomplete set 104. In other implementations, although all three items M1, M2 and M3 may have corresponding data fields with non-null values, the mapper 112 may receive a user specification that one of the three items in the incomplete set 104 is (suspected of being) incorrect. In such implementations, the mapper 112 deems the remaining two metadata items (that are different from the user specified item) as the known metadata items of the accessed incomplete set 104.

Once the determination of the known metadata items is completed, the mapper 112, generates a view of a map that includes representations of the known metadata items from the incomplete set of metadata items 104. The map view can be displayed in a map viewer of the user interface associated with the system 100.

For example, the mapper 112 can determine that the known items of the incomplete set of metadata items 104 are item M1, relating to the acquisition location 152, and item M2, relating to the acquisition orientation 154. The mapper 112 can further determine that the unknown item of the incomplete set of metadata items 104 is item M3, relating to a location 156 of the subject S depicted in the digital image 102. In this example, the mapper 112 displays a view of the map 130 and overlays representations of the known items of image metadata M1 and M2 on the displayed map view 130. The representation of the known item M1 relating to the acquisition location 152 can be a pin placed at a map point corresponding to the GPS coordinates, e.g., latitude and longitude, of the acquisition location. Another representation of the known item M1 relating to the acquisition location 152 can be a label including at least some of the GPS coordinates, the location's name, a thumbnail of the digital image 102, etc. The representation of the known item M2 relating to the acquisition orientation 154 can be a ray (e.g., a vector) that originates at the acquisition point and is directed in a direction specified by a compass heading of the camera that acquired the digital image 102. The ray can be depicted as a vector having a predetermined length that is based on the scale of the map 130, for example. As another example, the vector can have a length that represents the focus distance associated with the digital image 102, as recorded in the image metadata 122. As yet another example, the vector can extend from the map point corresponding to the acquisition point all the way to the boundary of the map view 130. Details relating to this case are described below in connection with FIG. 2A.

As another example, the mapper 112 can determine that the known items of the incomplete set of metadata items 104 are item M1, relating to the acquisition location 152, and item M3, relating to a location 156 of the subject S depicted in the digital image 102. The mapper 112 can further determine that the unknown item of the incomplete set of metadata items 104 is item M2, relating to the acquisition orientation 154. In this example, the mapper 112 displays a view of the map 130' and overlays representations of the known items of image metadata M1 and M3 on the displayed map view 130'. The representation of the known item M1 relating to the acquisition location 152 can be a pin placed at a map point corresponding to the acquisition location. Other representations of the known item M1 relating to the acquisition location 152 are described above in connection with the view of map 130. The subject S displayed in the digital image can be an objective of interest such as a landmark, a building, a campus, a park, a forest, and any other objectives of interest having a map footprint that is available to at least an approximate degree. As such, the representation of the known item M3 relating to the location 156 of the subject S depicted in the digital image 102 can be a polygonal contour corresponding to the map-footprint of to the image's subject. Depending on the scale of the map, the contour overlaid on the map 130' to represent the subject S depicted in the image 102 can collapse into a point. For instance, on a high magnification (zoomed-in) map view 130', a contour corresponding to Coit Tower in San Francisco can accurately represent the perimeter of this objective of interest. However, on a low magnification (zoomed-out) map view 130', Coit Tower can be represented by a point on the map. The shape and proportions relative to a map zoom of the contour associated with an objective of interest can be stored in a data repository and accessed by the metadata curator utility 110 as needed. In some implementations, the system 100 can host the data repository including polygonal contours corresponding to objectives of interest, or such data repository can be accessed online by the metadata curator utility 110 of the system 100. Details relating to this case are described below in connection with FIGS. 3A and 4A.

As yet another example, the mapper 112 can determine that the known items of the incomplete set of metadata items 104 are item M3, relating to a location 156 of the subject S depicted in the digital image 102 and item M2, relating to the acquisition orientation 154. The mapper 112 can further determine that the unknown item of the incomplete set of metadata items 104 is item M1, relating to the acquisition location 152. In this example, the mapper 112 displays a view of the map 130" and overlays representations of the known items of image metadata M3 and M2 on the displayed map view 130". The subject S displayed in the digital image can be an objective of interest and, as such, the representation of the known item M3 relating to the location 156 of the subject S depicted in the digital image 102 can be a polygonal contour corresponding to a map-footprint of to the objective of interest that is the image's subject. The representation of the known item M2 relating to the acquisition orientation 154 can be a directed line (e.g., a vector) that (i) is directed in a direction specified by a compass heading of the camera that acquired the digital image 102 and that (ii) has a specified proximity to the overlaid polygonal contour. The mapper of known metadata 112 can automatically place on the map view 130" the directed line relating to the acquisition orientation 154 to intersect the overlaid contour representing the location 156 of the subject S depicted in the image 102. In this case, the directed line representing metadata item M2 can span the map view 130" and end at the intersection with the overlaid contour associated with the image's subject. Alternatively, the directed line representing the metadata item M2 can be placed by the mapper of known metadata 112 on the map view 130" at a distance less than a pre-specified distance from the overlaid contour corresponding to the object of interest depicted in the image 102. In the latter case, the directed line representing metadata item M2 can span the entire map view 130". In some implementations, the relative position of the directed line representing metadata item M2 with respect to the overlaid contour representing the location 156 of the subject S depicted in the image 102 can be specified by the user (e.g., whether or not the directed line intersects the polygonal contour, and if so, where they intersect.)

Any of the map views 130, 130' and 130" having the overlaid corresponding representations associated with the known items of the incomplete set of metadata items 104 can be input to the generator of candidates for unknown metadata 114. If necessary, other items of the image metadata 122 can be used by the generator 114 to generate the candidates for the unknown item from among the metadata items M1, M2 and M3.

In the example related to representing the known metadata items M1 and M2 on the map view 130, the candidate generator 114 can generate candidates S1, S2, S3, . . . for the subject S depicted in the image 102 by identifying objectives of interest that have map-footprints located within a specified distance from the ray that originates at the acquisition location 152 and is directed according to the acquisition orientation 154. In some implementations, the ray determined by the known metadata items M1 and M2 must intersect a polygonal contour of an objective of interest in order for the latter to be deemed a candidate for the subject depicted in the digital image 102. Details relating to this example are described below in connection with FIGS. 2B-2D. Alternatively or additionally, the candidate generator 114 can use another subset of the image metadata 122 to calculate depth of field. The other subset of the image metadata 122 is associated with the camera that acquired the image 102 and typically includes focus distance, focal length and aperture. In addition, the candidate generator 114 may access information related to camera sensor size in tables corresponding to multiple cameras associated with the system 100. The calculated depth of field can be used by the candidate generator 114 as a hint to suggest the candidate subjects S1, S2, S3, . . . of the image 102.

In the other example related to representing the known metadata items M1 and M3 on the map view 130', the candidate generator 114 can generate candidates for the unknown item of metadata M2 corresponding to the acquisition direction 154 by determining an angular range between leftmost and rightmost lines of sight from the point corresponding to the acquisition location 152 to the polygonal contour associated with the subject S depicted in the digital image 102. Details relating to this example are described below in connection with FIG. 3B.

In the other example related to representing the known metadata items M3 and M2 on the map view 130", the candidate generator 114 can generate candidates for the unknown item of metadata M1 corresponding to the acquisition location 152 by determining a positional range along the directed line determined by the acquisition orientation 154 that has a specified proximity to the overlaid polygonal contour associated with the subject S depicted in the digital image 102. For example, assuming that the subject S depicted in the image 102 is in focus, then there is a range of distances from the subject S to the potential camera locations. The range of distances corresponds to a depth of field for the image 102 that can be determined based on information including focal length, sensor size and aperture of the camera that acquired the image 102. The foregoing camera specific information can be part of either the image metadata 122 associated with the captured image 102 or can be part of information relating to cameras associated with the system 100.

The selector of the candidate for the unknown metadata 116 can receive a set of candidates for the unknown metadata from the candidate generator 114. The selection of the candidate for the unknown metadata can be performed by the candidate selector 116 if the set of candidates includes at least two candidates for the unknown metadata. In an automated mode of the metadata curator utility 110, the selection performed by the candidate selector 116 can be based at least in part on selection rules 142. Alternatively, in an interactive mode of the metadata curator utility 110, the selection performed by the candidate selector 116 can be based at least in part on user input 144, such as a user specified selection.

Moreover, when the set of candidates includes only one candidate for the unknown metadata, then the candidate selector 116 can perform a validation of the candidate instead of a selection. In an automated mode of the metadata curator utility 110, the validation performed by the candidate selector 116 can be based at least in part on validation rules 142. Alternatively, in an interactive mode of the metadata curator utility 110, the validation performed by the candidate selector 116 can be based at least in part on a user specified validation 144. The metadata curator 110 can use the user specified candidate selection or validation 144 to refine the selection/validation rules 142 used by the candidate selector 116 to automatically select between the candidates for unknown metadata. In addition, the user specified candidate selection or validation 144 can be used by the metadata curator 110 to teach (and/or improve the ability of) the mapper 112, the candidate generator 114 and the candidate selector 116 to perform their respective automated tasks described above.

In the example related to generating, on the map view 130, a set of candidates S1, S2, S3, . . . for the subject S depicted in the image 102, such that each of the candidates is determined by the known metadata items M1 and M2, the candidate selector 116 can automatically select one of candidates S1, S2, S3, . . . based at least in part on proximity from the acquisition location 152 to the selected candidate. Similarly, if the set of candidates generated on the map view 130 includes only one candidate S1 for the subject S depicted in the image 102, such that the candidate S1 is determined by the known metadata items M1 and M2, then the candidate selector 116 can validate the candidate S1 based at least in part on proximity form the acquisition location 152 to the validated candidate S1. Other rules used to automatically select and/or validate a candidate for the subject depicted in the image 102 from the generated set of candidates are described below in connection with FIGS. 2B-2D. Alternatively, the candidate selector 116 can present to a user a list of the candidates S1, S2, S3, . . . such that each of the candidates is determined by the known metadata items M1 and M2, and can receive from the user a selection of a candidate for the subject depicted in the image 102 from the presented list. Similarly, the candidate selector 116 can present to the user only one candidate S1 for the subject S depicted in the image 102, such that the candidate S1 is determined by the known metadata items M1 and M2, and can receive from the user a validation of the candidate for the subject depicted in the image 102.

In the other example related to generating, on the map view 130', a set of candidate rays having directions in the angular range between leftmost and rightmost lines of sight from the point corresponding to the acquisition location 152 to the polygonal contour associated with the subject S depicted in the digital image 102, the candidate selector 116 can automatically select as the ray corresponding to the acquisition orientation 154 a ray from the set of candidate rays that has the origin at the point corresponding to the acquisition location 152 and points in a direction corresponding to a mean of the determined angular range. Other rules used to automatically select a candidate for the metadata item corresponding to the acquisition direction 154 from the generated set of candidates are described below in connection with FIGS. 3B and 4B. Alternatively, the candidate selector 116 can prompt a user to select a ray from among the set of candidate rays having directions in the determined angular range, and can receive from the user a selection of one of the rays from among the set of candidate rays.

In the other example related to generating, on the map view 130", a set of candidate acquisition locations within the positional range along the directed line determined by the acquisition orientation 154 that has a specified proximity to the overlaid polygonal contour associated with the subject S depicted in the digital image 102, the candidate selector 116 can automatically select as the acquisition location 152 the mean of the determined positional range. Another selection rule specifies that the candidate selector 116 can automatically select as the acquisition location 152 a point on the directed line that is located at a distance substantially equal to the focus distance from the overlaid polygonal contour associated with the subject S depicted in the digital image 102. Alternatively, the candidate selector 116 can prompt a user to select an acquisition location within the determined positional range, and can receive from the user a selection of the acquisition location 152 within the determined positional range.

The example implementation of the system 100 described above in connection with FIG. 1 has been used to determine/correct a third metadata item from a set of metadata items (M1—acquisition location 152, M2—acquisition orientation 154, M3—subject location 156) when the other two metadata items are known/correct. However, the metadata curator 110 can be operated when two metadata items from the set of metadata items (M1, M2, M3) are missing/incorrect, and only one of the metadata items is known/correct. Moreover, the metadata curator 110 also can be operated when all three metadata items from the set of metadata items (M1, M2, M3) are missing/incorrect. In the latter instances, the metadata curator 110 can receive from a user associated with the system 100 values for missing/incorrect metadata items from the set of metadata items (M1, M2, M3). For example, the metadata curator 110 can receive from the user a value associated with one of the missing/incorrect metadata items from the set of metadata items (M1, M2, M3) and can fill in (or suggest to the user) the other values of the two missing/incorrect metadata items as described below.

If the other two values are both missing or are both incorrect, the system 100 can be configured to guess a value for one of the other two missing/incorrect values. Then the metadata curator 110 can be applied to the set 104 of metadata items (M1, M2, M3) as described above in connection with FIG. 1, because in this case, the set 104 of metadata items (M1, M2, M3) includes one item having a missing/incorrect value, and two items having known values. In this case, the item having the guessed value and the item having the value entered by the user are considered to be the items with known values. The curated set (M1, M2, M3) 150 obtained as a result of this first iteration includes one item having a guessed value, and two items having known values. The metadata curator 110 can be applied as described in connection with FIG. 1 once again, this second time to the set 104 of metadata items (M1, M2, M3) corresponding to the curated set (M1, M2, M3) 150 from the first iteration that includes one item having the guessed value, and two items having known values. In the latter case, the item having the value generated by the metadata curator 110 as a result of the first iteration and the item having the value entered by the user are considered to be the items with known values. The curated set (M1, M2, M3) 150 obtained as a result of this second iteration includes three metadata items having correct values. The user can decide whether to stop this iterative cycle after the first iteration, the second iteration or whether to perform one or more additional iterations after the second iteration.

If one of the other two values is missing and the other one of the other two values is incorrect but not missing, then the metadata curator 110 can be applied to the set 104 of metadata items (M1, M2, M3) as described above in connection with FIG. 1, because in this case, the set 104 of metadata items (M1, M2, M3) includes one item having a missing value, and two items having known values. In this case, the item having the incorrect value and the item having the value entered by the user are considered to be the items with known values. The curated set (M1, M2, M3) 150 obtained as a result of this first iteration includes one item having an incorrect value, and two items having known values. The metadata curator 110 can be applied as described in connection with FIG. 1 once again, this second time to the set 104 of metadata items (M1, M2, M3) corresponding to the curated set (M1, M2, M3) 150 from the first iteration that includes one item having the incorrect value, and two items having known values. In the latter case, the item having the value generated by the metadata curator 110 as a result of the first iteration and the item having the value entered by the user are considered to be the items with known values. The curated set (M1, M2, M3) 150 resulting after this second iteration includes three items having correct values. The user can decide whether to stop this iterative cycle after the first iteration, the second iteration or whether to perform one or more additional iterations after the second iteration.

A user of the image processing application associated with the system 100 can classify, organize and manage images stored in a library of digital images based on geo-tagging information. The accuracy of the information used for geo-tagging can be improved by using the metadata curator utility 110 to add missing metadata items and/or to fix incorrect items of metadata associated with the images of the library. Examples of applying the metadata curator utility 110 to obtain curated sets of metadata items 150, such that each of the curated sets contains acquisition location (metadata item M1), acquisition orientation (metadata item M2) and location of a subject depicted in the image (metadata item M3), are described below in this specification in connection with FIGS. 2A-2D, 3A-3B and 4A-4B.

FIGS. 2A-2D show aspects of a system 200 that is used to identify a subject depicted in an image. The system 200 can be implemented, for example, as part of an image processing application. For instance, the system 200 can correspond to an implementation of the system 100 for determining geo-metadata (e.g., an identifier and geo-location) associated with a subject depicted in an image given known geo-location and geo-orientation of the camera that acquired the image.

Figure 2A:
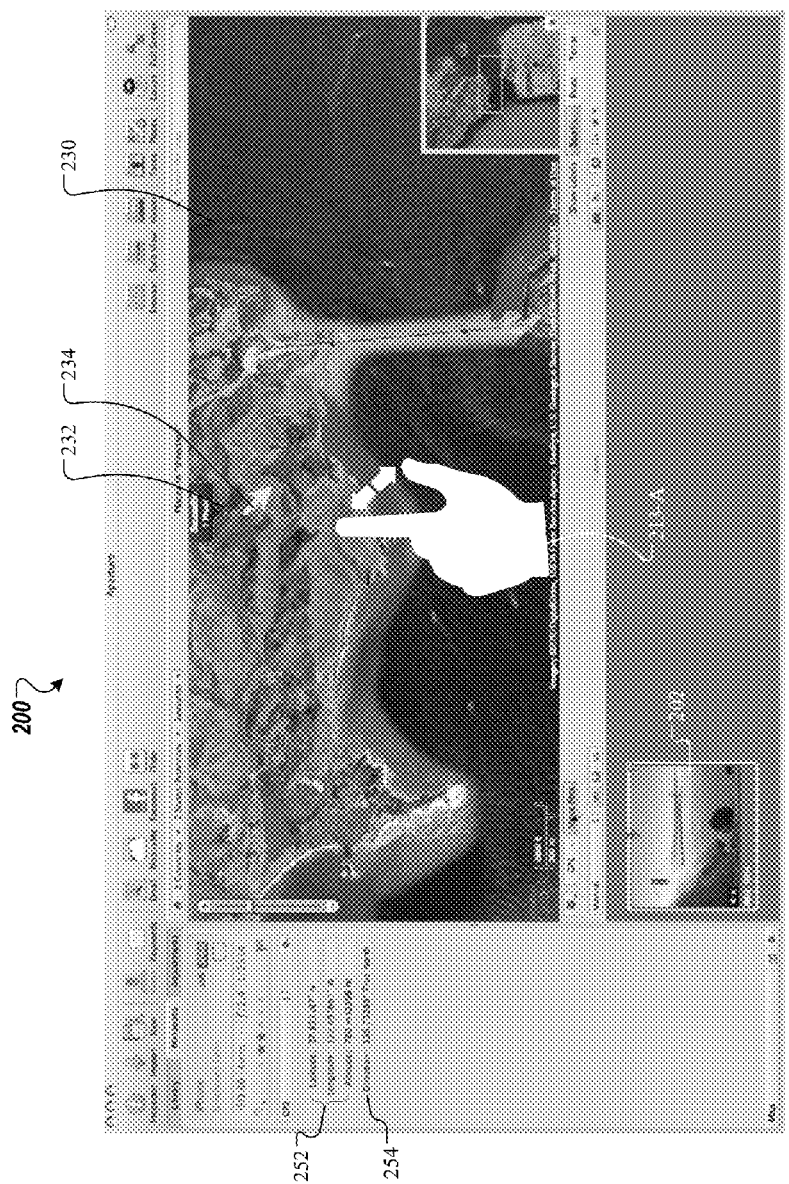
FIGS. 2A-2E show aspects of a system that is used to identify a subject depicted in an image.

FIG. 2A shows a graphical user interface of the system 200 that displays a view of an image 202. Metadata stored along with the image 202 includes the acquisition location 252. Information related to the acquisition location 252 includes values of the longitude, latitude and altitude of the location of the camera that acquired the image 202. In FIG. 2A, the acquisition location 252 is in the vicinity of Sausalito, Calif. In addition, the image metadata includes the acquisition orientation 254. Information related to the acquisition orientation includes a relative angle with respect to True North as provided by a compass onboard the camera that acquired the image 202. In FIG. 2A, the camera that acquired the image 202 was pointing approximately southeast-ward.

The graphical user interface of the system 200 also includes a view of a map 230. The view of the map 230 corresponds to a geographical area including the acquisition location 252, in this case a vicinity of Sausalito, Calif. The system 200 can represent the acquisition location 252 on the map view 230 by using a pin 232. Other graphical representations can be overlaid on the map view 230 instead of the pin 232 to represent the acquisition location 252, e.g., a thumbnail of the image, a dot, a star, etc. In some implementations, the pin 232 can be displayed concurrently with a label that includes the name of the pin location and the number of images associated with this pin. In FIG. 2A, the pin 232 is labeled Sausalito and only the image 202 is associated with this pin 232. The system can represent the acquisition direction 254 associated with the image 202 by overlaying on the map view 230 an arrow 234 that has the origin at the pin 232. In some implementations, the length of the arrow 234 representing the acquisition direction can be proportional to the acquisition focus distance for the image 202. In other implementations, however, when no information about the focus distance is available as part of the image metadata, the length of the arrow 202 representing the acquisition direction can be preselected. For example, the length of the arrow 234 can be adapted based on a zoom-level of the map view 230. As another example, the length of the arrow 234 can be a default length corresponding to dimensions of the map view 230.

Figure 2B:
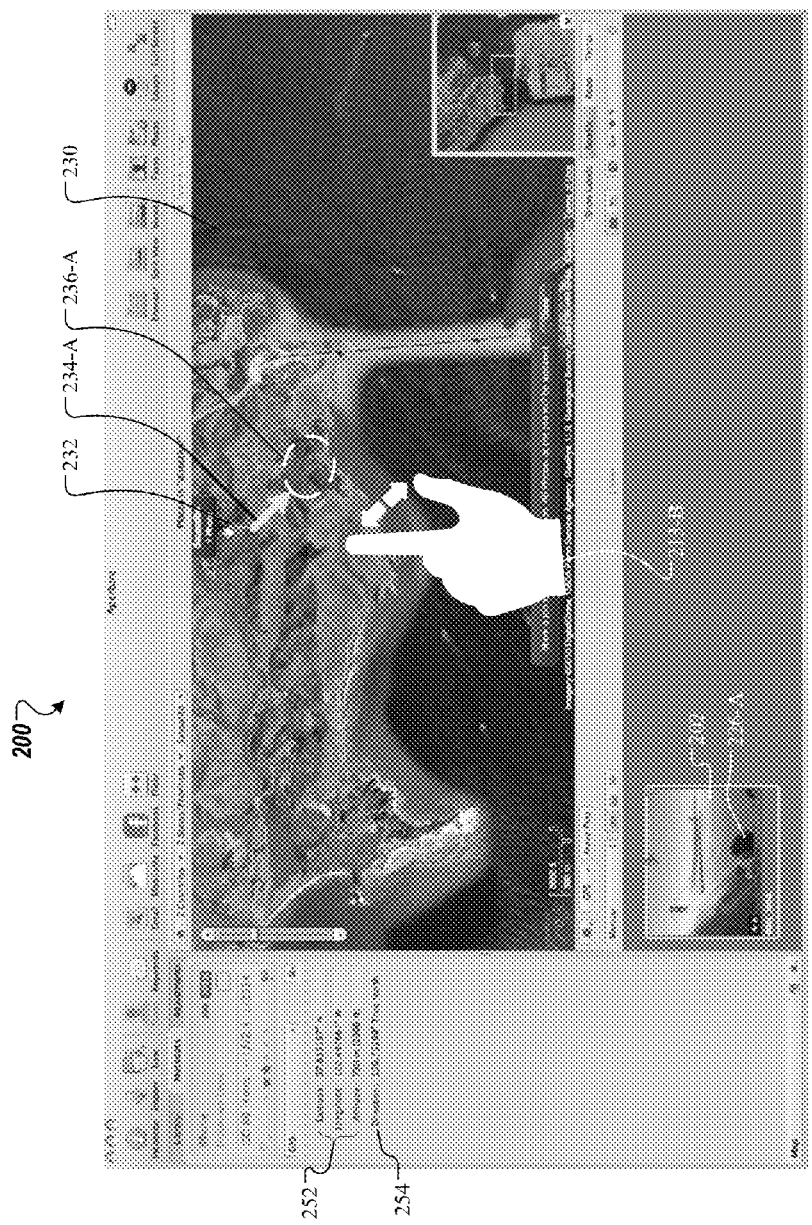
Figure 2C:
Figure 2D:

The metadata items related to acquisition location 252 and acquisition direction 254 can be used to geo-tag the image 202, and hence, the image 202 can be classified as an image acquired in Sausalito, for instance. However, no metadata is initially available, in this example, relating to the identity and location of a subject depicted in the image 202. The subject of the image 202 shown in FIG. 2A is the Golden Gate Bridge, in San Francisco, Calif. So using only the available metadata items 252 and 254, the image 202 would not be classified as an image of the Golden Gate Bridge nor would it be classified as an image depicting a subject located in San Francisco. Techniques to determine the subject depicted in an image based on the known acquisition location 252 and acquisition orientation 254 are described below. FIGS. 2B, 2C and 2D show that the system 200 can receive a user request to identify objectives of interest along the direction of the arrow 234 associated with the acquisition orientation 254 for the image 202. While details of the interactive mode associated with identifying the image's subject are described below in connection with FIGS. 2B, 2C and 2D, aspects of the automated mode of this technology have been described above in connection with FIG. 1.

In some implementations, a user can request to extend the arrow 234 through a multi-touch gesture, for example a first reverse-pinch gesture 213-A. In other implementations, a user can press-and-hold on the origin of the arrow 234 by using either a single-touch gesture or a cursor. In response to receiving any one of the foregoing user inputs, the system 200 can extend the length of the arrow 234 along the arrow direction 254. As it extends, the arrow 234 may intersect and/or pass by objectives of interest that may be depicted in the image 202. Locations and polygonal contours corresponding to multiple such objectives of interest can be stored locally or accessed on a remote data repository by the system 200.

FIG. 2B shows that, when an instance 234-A of the extended arrow reaches a first objective of interest, a polygonal contour 236-A associated with the first objective of interest can be highlighted on the map view 230. In this case, the first objective of interest along the direction 254 of the extended arrow 234-A is the Conzelman Forest. Alternatively or additionally, the entire area inscribed by the polygonal contour 236-A associated with the first objective of interest can be highlighted on the map view 230 upon the extended arrow 234-A reaching the first objective of interest. Alternatively or additionally, when the extended arrow 234-A reaches the first objective of interest, the system 200 can display a label identifying the first objective of interest. In this case the label may read "This is the Conzelman Forest". In addition, the system 200 can add the first encountered objective of interest to a list of candidates for the image's subject. Alternatively or additionally, the system 200 can display an I/O control, which identifies the first objective of interest and requests input from the user, upon the extended arrow 234-A reaching the first objective of interest. In this case the I/O control may read "Is the Conzelman Forest depicted in your image? Yes, no, decide later." At this point, the user can examine the image 202 to determine whether the tree top 226-A depicted in the image 202 is part of the Conzelman Forest and whether this first objective of interest is indeed the image's subject. If the user specifies that the Conzelman Forest is the subject of the image 202, the system 200 can augment the image metadata 222 with a metadata item that includes an identifier of the image's subject as "The Conzelman Forest" and the location of the image's subject. The location of the image's subject can be stored as GPS coordinates (e.g. latitude and longitude), and/or as hierarchical geo-information (e.g., "in Marin County, CA, USA".) If, however, the user does not identify the Conzelman Forest as the image's subject, and instead continues to apply the multi-touch gesture 213-A or applies an additional multi-touch gesture 213-B, the system 200 further extends the instance of the arrow 234-A until it reaches a subsequent objective of interest.

FIG. 2C shows that, when an instance 234-B of the extended arrow reaches a second objective of interest, at least a portion of the polygonal contour 236-B associated with the second objective of interest can be highlighted on the map view 230. In this case, the second objective of interest along the direction 254 of the extended arrow 234-B is Marin County. Alternatively or additionally, when the extended arrow 234-B reaches the border of Marin County, the system 200 can display a label identifying the second objective of interest. In this case the label may read "Marin County". In addition, the system 200 can add the second encountered objective of interest to the list of candidates for the image's subject along with the previously encountered first objective of interest. Alternatively or additionally, the system 200 can display an I/O control, which identifies the second objective of interest and requests input from the user, upon the extended arrow 234-B reaching the second objective of interest. In this case the I/O control may read "Is Marin County depicted in your image? Yes, no, decide later." At this point, the user can examine the image 202 to determine whether the cliff 226-B depicted in the image 202 is part of Marin County and whether this second objective of interest is indeed the image's subject. If the user specifies that Marin County is the subject of the image 202, the system 200 can augment the image metadata with a metadata item that includes an identifier of the image's subject as "Marin County" and the location of the image's subject. The location of the image's subject can be stored as GPS information (e.g. latitude and longitude), and/or as hierarchical information (e.g., "in California, USA".) If, however, the user does not identify Marin County as the image's subject, and instead continues to apply the multi-touch gesture 213-B or applies an additional multi-touch gesture 213-C, the system 200 continues to extend the instance of the arrow 234-B until it reaches a subsequent objective of interest.

FIG. 2D shows that, when an instance 234-C of the extended arrow reaches a third objective of interest, at least a portion of the polygonal contour 236-C associated with the third objective of interest can be highlighted on the map view 230. In this case, the third objective of interest along the direction 254 of the extended arrow 234-C is the Golden Gate Bridge. Alternatively or additionally, when the extended arrow 234-C reaches the third objective of interest, the system 200 can display a label identifying the third objective of interest. In this case the label may read "This is the Golden Gate Bridge." In addition, the system 200 can add the third encountered objective of interest to the list of candidates for the image's subject along with the previously encountered first and second objectives of interest. Alternatively or additionally, the system 200 can display an I/O control, which identifies the third objective of interest and requests input from the user, upon the extended arrow 234-C reaching the third objective of interest. In this case the I/O control may read "Is the Golden Gate Bridge depicted in your image? Yes, no, decide later." At this point, the user can examine the image 202 to determine whether the bridge 226-C depicted in the image 202 is the Golden Gate Bridge and whether this third objective of interest is indeed the image's subject. If the user specifies that the Golden Gate Bridge is the subject of the image 202, the system 200 can augment the image metadata with a metadata item that includes an identifier of the image's subject as "The Golden Gate Bridge" and the location of the image's subject. The location of the image's subject can be stored as GPS information (e.g. latitude and longitude), and/or as hierarchical information (e.g., "in San Francisco, Calif., USA".) If, however, the user does not identify the Golden Gate Bridge as the image's subject, the system 200 continues to extend the instance of the arrow 234-C until it reaches a subsequent objective of interest.

The system 200 can extend the arrow 234 at a rate that makes it possible for the user to see the tip of the arrow continuously advance across the map view 230, as long as the press-and-hold gesture is being applied by the user. Alternatively, the system 200 can extend the arrow 234 in discrete steps, for example the discrete steps associated with the multi-touch gestures 213-A, 213-B, 213-C, etc., each of the steps corresponding to a distance along the acquisition direction 254 between successive objectives of interest. In some implementations, the system 200 can extend the arrow 234 until it reaches an edge of the map view 230. At this point the user has the option of requesting that a new map view be displayed in the graphical user interface of the system 200 by zooming-out the map view 230. The process of repeatedly extending the arrow 234 as it encounters additional objectives of interest can continue on the new map view. In some implementations, the system 200 can calculate a distance from the acquisition location 252 to the horizon along the line of sight corresponding to the acquisition orientation 252. As such, the arrow 234 can be extended only up to the calculated distance.

Moreover, if the user has not selected as the image's subject any one of the objectives of interest upon an individual encounter between the extended arrow 234 and the objective of interest, the user can select the image's subject from the list of candidates generated by the system 200 to include all the objectives of interest encountered along the direction of the extended arrow. In some implementations, the list of candidates for the image's subject can be sorted in the order in which the extending arrow has encountered the objectives of interest. For example, the user can select from the list of candidates the third list entry corresponding to the Golden Gate Bridge to be the image's subject. Moreover, if the focus distance corresponding to the image 202 is missing from the image metadata 222 (or if the focus distance has been stored with an incorrect value), the length of the arrow 234-C, which corresponds to the objective of interest 236-C selected by the user as the image's subject 226-C, can provide the (corrected) focus distance.

In other implementations, the list of candidates for the image's subject can be sorted in increasing order of proximity to a focus point corresponding to the focus distance recorded as part of the image metadata 222. For instance, if the image metadata 222 includes a short focus distance, as if the photographer focused on the tree top 226-A, then the candidate image subjects are listed in increasing order of proximity from the nearby focus point, with the Conzelman Forest being first, Marin County being second and the Golden Gate Bridge being third on the list. However, if the if the image metadata 222 includes a long focus distance, e.g. ≈2.5 km or infinity, as if the photographer focused on the Golden Gate Bridge 226-C, then the candidate image subjects are listed in increasing order of proximity from the distant focus point, with the Golden Gate Bridge being first, Marin County being second and the Conzelman Forest being third on the list.

Once the list of candidates for the image's subject has been sorted using the criteria described above, a user can select the subject of the image 202 as the top entry of the sorted list or as any one of the other list entries. However, when operating in a non-interactive mode, such that users are not required to perform the selection of the image's subject, the system 200 can be configured to automatically select the subject of the image 202 as the top entry in the sorted list of candidates for the image's subject.

Additionally, the user can select multiple subjects depicted in the image 202. In such cases, the system 200 can augment the image metadata 222 with respective metadata items corresponding to the selected image subjects, each of which includes an identifier of the image's subject and its location. For example, if the user specifies that both the Golden Gate Bridge and Marin County are subjects of the image 202, the system 200 can save an identifier of the first subject of the image 202 as "The Golden Gate Bridge" along with the location of the image's first subject, and another identifier of the second subject of the image 202 as "Marin County" along with the location of the image's second subject. The location information related to the Golden Gate Bridge can include hierarchical information "San Francisco, Calif., USA," while location information related to Marin County can include hierarchical information "Marin County, California, USA." In this fashion, the image 202 would be included in a result of a search for images depicting subjects located in San Francisco, and also would be included in a result of another search for images depicting subjects located in Marin County.

Figure 2E:
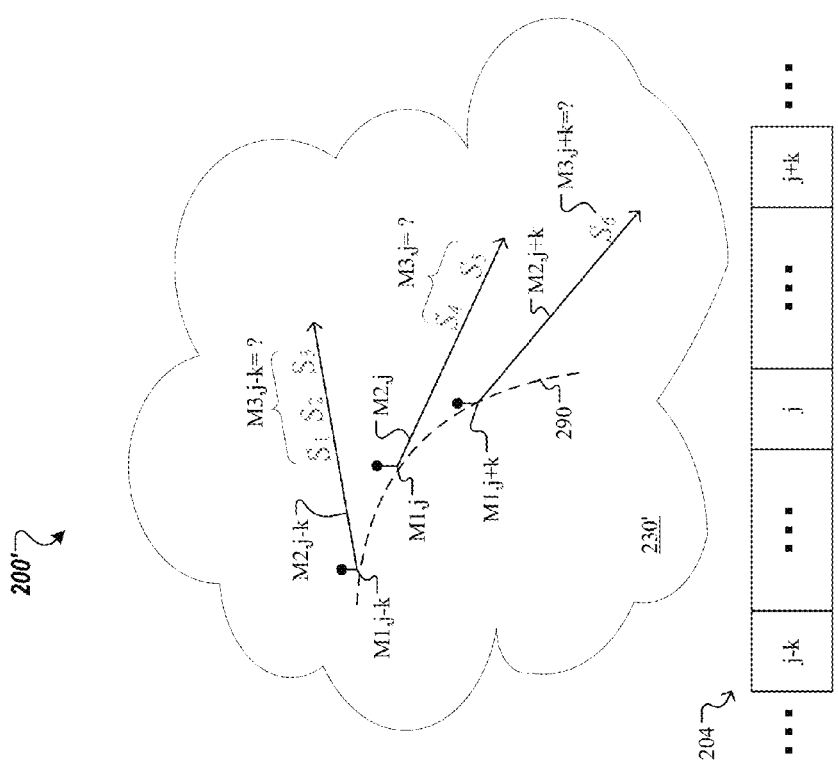

FIG. 2E shows an example implementation of a system 200' that is used to identify multiple subjects depicted in a sequence of video frames 204. The system 200' can be implemented, for example, as part of an image processing application. For instance, the system 200' can correspond to a combination of the systems 100 and 200 for determining geo-metadata (e.g., identifiers and geo-locations) associated with multiple subjects depicted in the sequence of video frames 204, given a known set of geo-locations and geo-orientations of the camera that acquired the sequence of video frames 204. FIG. 2E shows a graphical user interface of the system 200' that displays a view of the sequence of video frames 204. The $j^{th}$ frame in the sequence of video frames 204 can depict one or more subjects. Another frame "j−k" that was acquired k-frames prior to the $j^{th}$ frame can depict the same or different subject(s) than the $j^{th}$ frame. Similarly, the subject(s) of another frame "j+k" that was acquired k-frames after the $j^{th}$ frame can be the same or different from the subject(s) of the $(j−k)^{th}$ and $j^{th}$ frames. In this example, k can be a quantity of frames equal to 10, 100, 1000, etc. Metadata associated with at least some of the sequence of video frames 204, e.g. with the $j^{th}$ frame, can include corresponding acquisition location $M_{1,j}$ and acquisition orientation $M_{2,j}$ in analogy with the image metadata described above in connection with FIG. 1.

The graphical user interface of the system 200' also includes a view of a map 230'. The view of the map 230' corresponds to a geographical area including a path 290 along which at least a portion of the sequence of video frames 204 was acquired. The system 200' can represent acquisition locations for at least some of the sequence of video frames 204. In FIG. 2E, the respective acquisition locations $M_{1,(j−k)}$, $M_{1,j}$ and $M_{1,(j+k)}$ of the $(j−k)^{th}$, $j^{th}$ and $(j+k)^{th}$ frames, e.g. given in terms of GPS coordinates, are depicted on the map view 230' by using pins. The system 200' also can represent respective acquisition directions $M_{2,(j−k)}$, $M_{2,j}$ and $M_{2,(j+k)}$ of the $(j−k)^{th}$, $j^{th}$ and $(j+k)^{th}$ frames, by using rays (e.g., vectors) that originate at the respective acquisition locations $M_{1,(j−k)}$, $M_{1,j}$ and $M_{1,(j+k)}$ of the $(j−k)^{th}$ and $(j+k)^{th}$ frames, and are directed in respective directions specified by compass headings of the camera that acquired the sequence of video frames 204.

The system 200' can generate candidate subjects and then select the most likely subject(s) from among the generated candidates for each one of the frames "j−k", "j" and "j+k" of the sequence of video frames 204. The candidates are generated and then the most likely subject(s) are picked either automatically or interactively, as described above with reference to systems 100 (in FIG. 1) and 200 (in FIGS. 2A-2D.) For example, the system 200' can generate and then represent on the map view 230' candidate subjects S1, S2 and S3 for the frame "j−k". The system 200' can then select, e.g., the candidate subject S3 as the subject of the $(j−k)^{th}$ frame. As such, a metadata item $M_{3,(j−k)}$ including subject S3's identity and geo-location can be associated with the $(j−k)^{th}$ frame, as well as with the sequence of video frames 204. As another example, the system 200' can generate and then represent on the map view 230' candidate subjects S4 and S5 for the frame "j". The system 200' can then select, e.g., the candidate subject S4 as the subject of the $j^{th}$ frame. As such, a metadata item $M_{3,j}$ including subject S4's identity and geo-location can be associated with the $j^{th}$ frame, as well as with the sequence of video frames 204. As yet another example, the system 200' can generate and then represent on the map view 230' candidate subject S6 for the frame "j+k". The system 200' can then validate, e.g., the candidate subject S3 as the subject of the $(j−k)^{th}$ frame. As such, a metadata item $M_{3,(j+k)}$ including subject S6's identity and geo-location can be associated with the $(j+k)^{th}$ frame, as well as with the sequence of video frames 204.

In this fashion, the system 200' can be used to identify multiple subjects, e.g., landmarks, points of interest, and the like, within a video and can store the identified subjects along with the metadata associated with the video. In the example described above in connection with FIG. 2E, information relating to subjects S3, S4 and S6 is stored as part of the metadata associated with the sequence of video frames 204. Accordingly, the sequence of video frames 204 would be included in search results for videos depicting subjects from a location (square/street, city, county) of subject S3, from a location of subject S4 and from a location of subject S6.

Figure 3A:
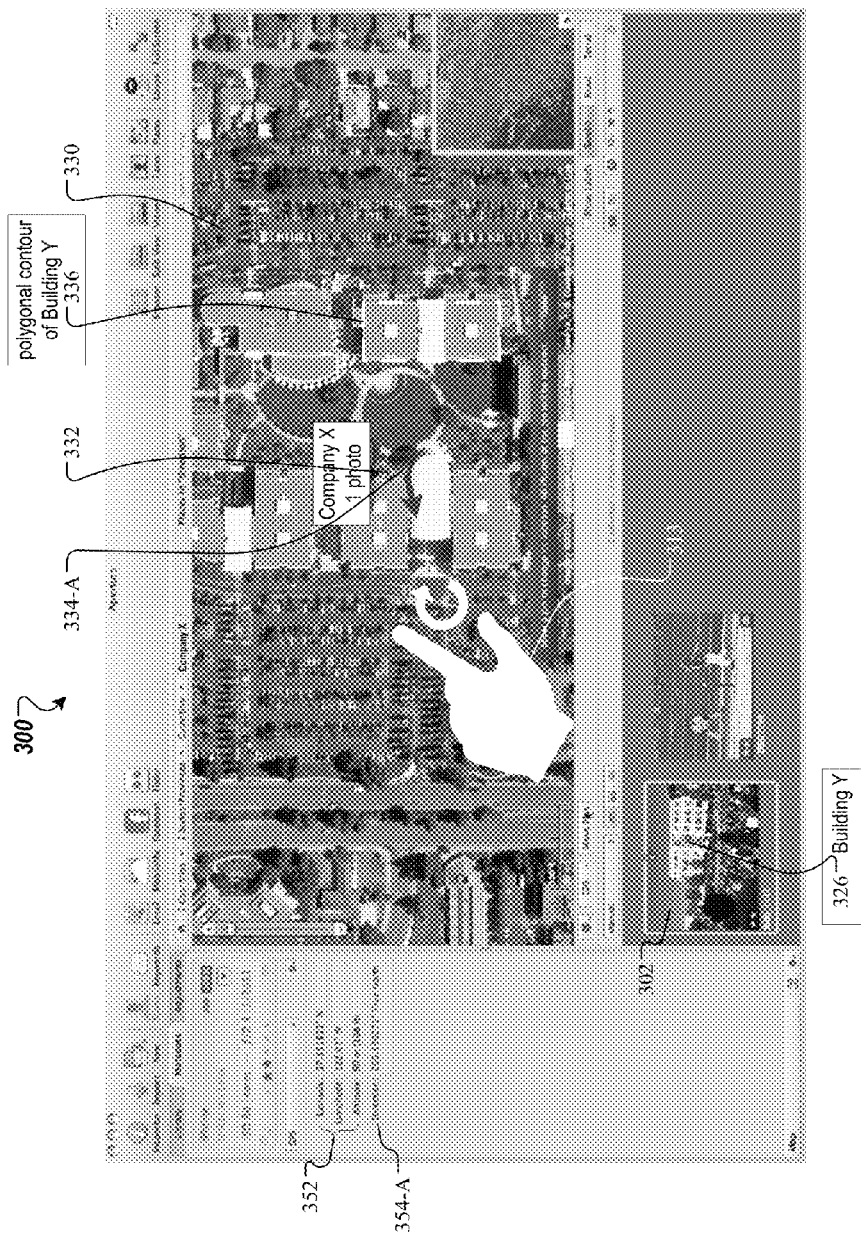
FIGS. 3A-3B show aspects of a system that is used to curate image metadata related to acquisition orientation.
Figure 3B:
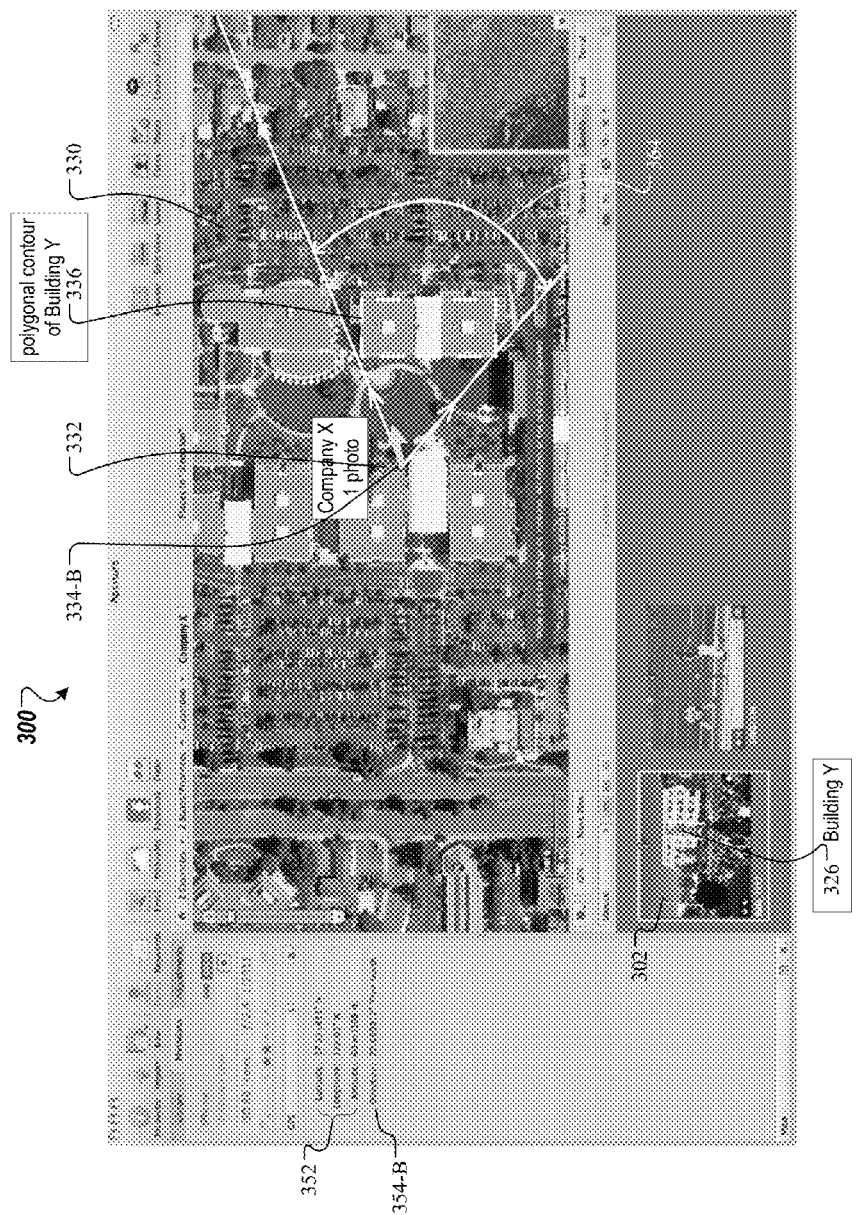

FIGS. 3A-3B show aspects of a system 300 that is used to curate image metadata related to acquisition orientation. The system 300 can be implemented, for example, as part of an image processing application. For example, the system 300 can correspond to an implementation of the system 100 for determining acquisition geo-orientation of the camera that acquired an image given known geo-location of the camera and geo-location of the subject depicted in the image. As another example, the system 300 can be an extension of the system 200 described above in connection with FIGS. 2A-2D or can be operated in conjunction with the system 200.

FIG. 3A shows a graphical user interface of the system 300 that displays a view of the image 302. Metadata stored along with the image 302 includes the acquisition location 352. Information related to the acquisition location 352 includes values of the longitude, latitude and altitude of the location of the camera that acquired the image 302. In FIG. 3A, the acquisition location 352 is in on the campus of company X in Cupertino, Calif. Further in FIG. 3A, a subject depicted in the image 302 is Building Y 326. In addition, the image metadata associated with the image 302 can include an identifier of the image's subject, in this case "Building Y".

The graphical user interface of the system 300 also includes a view of a map 330. The view of the map 330 corresponds to a geographical area including the acquisition location 352, in this case the campus of company X in Cupertino, Calif. The system 300 can represent the acquisition location 352 on the map view 330 by using a pin 332. Other graphical representations can be used to represent the acquisition location 352 as described above in connection with FIG. 2A. In addition, the system 300 can represent on the map view 330 the location of the image's subject as a polygonal contour 336 corresponding, in the case of image 302, to the map-footprint of Building Y 326.

Additionally, the image metadata can include an acquisition orientation 354-A, given in terms of a relative angle with respect to True North as provided by a compass onboard the camera that acquired the image 302. The system 300 can represent the currently stored acquisition direction 354-A associated with the image 302 by overlaying on the map view 330 an instance of an arrow 334-A pointing in the acquisition direction 354-A and having the origin at the pin 332. Based on the angle 354-A stored initially as part of the image metadata, it appears that the camera that acquired the image 302 was pointing westward. However, in this case, the orientation information 354-A must be wrong, because the instance of the arrow 334-A points away from the contour 336 of the Building Y 326, as if the camera was oriented in the opposite direction when it acquired the image 302 that depicts the Building Y 326.

The metadata items related to the acquisition location 352 and the location of the image's subject 336 can be used to geo-tag the image 302, and hence, the image 302 can be classified as an image of Building Y 326 acquired on the campus of Company X in Cupertino, for instance. However, as incorrect metadata relating to the acquisition orientation 354-A is initially available, in this example, the image 302 would be incorrectly classified as an image acquired by a camera facing westward. In some instances, a user may want to search a library of images for images that have good natural illumination. A possible query for finding such images could read "images acquired in the morning by a camera facing westward OR images acquired in the afternoon by a camera facing eastward." In case the image 302 was acquired in the afternoon, the image 302 would be retrieved by the foregoing query if the acquisition orientation 354-A were correct. However, as the latter is incorrect, the image 302 would be excluded by the foregoing query. The technologies disclosed in this specification for fixing the incorrect acquisition orientation 354-A stored along with the image metadata enables accurate classifications of images stored in a library, which in turn leads to accurate results of searches associated with the library.

Techniques to determine the correct acquisition orientation based on the known acquisition location 332 and the location of the image's subject 336 are described below. For example, a user may examine the image 302 and can recognize Building Y 326 on the campus of company X in Cupertino. Moreover, the user can enter "Building Y" in a metadata field associated with the subject of image 302. In addition, the user may notice that the arrow 354-A corresponding to the acquisition orientation for the image 302 of Building Y 326 incorrectly points away from the polygonal contour 336 of the building Y 326 as represented on the map 330. FIG. 3B shows that the system 300 can receive a user request to correct the orientation of the arrow 354-A which represents the orientation of the camera that acquired the image 302 of Building Y 326. While details of the interactive mode associated with correcting the acquisition orientation are described below in connection with FIG. 3B, aspects of the automated mode of this technology have been described above in connection with FIG. 1.

In some implementations, a user request to rotate the arrow 334 can be in the form of a multi-touch gesture, for example a rotate gesture 313. In other implementations, the user can press-and-hold on the origin of the arrow 334 by using either a single touch gesture or a cursor. In some other implementations, the user may type a value for the orientation of the arrow 334, e.g. in box 324-A, where the typed value may be a guestimate angle, e.g. 0°, 45°, 90°, 180°, etc., or may be an angle that results from a user calculation. In response to receiving such input, the system 300 can rotate the arrow 334 around the pin 332, starting from the instance 334-A. FIG. 3B shows that, when an instance 334-B of the rotated arrow reaches the location of the image's subject, the system 300 can highlight, on the map view 330, an angular range 364 that spans the polygonal contour 336 associated with the subject 326 depicted in the image 302. The angular range 364 determined by the system 300 can be bounded by the leftmost and rightmost lines of sight from the pin 332 (i.e., from the origin of the arrow 334) to the polygonal contour 336 associated with the image's subject. By determining the angular range 364, the system 300 can provide the user a coarse acquisition orientation associated with the image 302. For instance, the highlighted angular range 364, may suggest to the user that the correct acquisition orientation of the image 302 may lie within the angular range 364.

The system 300 can rotate the arrow 334 at an angular rate that makes it possible for the user to see the arrow 334 continuously rotate around the pin 332, as long as the press-and-hold gesture is being applied by the user. In some implementations, the system 300 can rotate the arrow 334, starting from the instance 334-A, in a direction specified by the rotate gesture 313, e.g. clock-wise in FIG. 3A. In other implementations, the system 300 can rotate the arrow 334 in one discrete step corresponding to an angular interval from the original orientation 354-A, corresponding to the instance 334-A of the arrow depicted in FIG. 3A, to the orientation 354-B, corresponding to the instance 334-B of the arrow depicted in FIG. 3B, when the rotated arrow reaches the polygonal contour 336 of the image's subject.

Moreover, the system 300 concurrently displays the view of image 302 depicting the subject 326 and the map view 330 depicting the polygonal contour 336 that corresponds to the image's subject, so the user can correctly select a direction of the arrow 334 based on correlations of the two displayed views. For instance, if the Building Y 326 is fully framed within the image 302, then the user may select to orient the arrow 334 substantially along the bisector of the angular range 364. However, if the only a portion of the Building Y 326 is depicted in the image 302, e.g., the left-half of the Building Y 326 is framed in the image 302, then the user may select to orient the arrow 334 along the leftmost line of sight from the pin 332 (i.e. from the origin of the arrow 334-B) to the polygonal contour 336 associated with the Building Y 326.

The user can select an acquisition orientation that is within or outside of the angular range 364 determined by the system 300. However, when operating in a non-interactive mode, such that users are not required to perform the selection of the acquisition orientation for the image 302, the system 300 can be configured to automatically select the orientation of the arrow 334 based on criteria described above in connection with FIG. 1. Once a direction for the arrow associated with the acquisition orientation, e.g., the instance of the arrow 334-B, is selected (whether interactively by the user or automatically by the system 300), then the system 300 can replace the incorrect acquisition orientation information 354-A initially stored as part of the image metadata with the angle 354-B corresponding to the selected arrow 334-B.

Figure 4A:
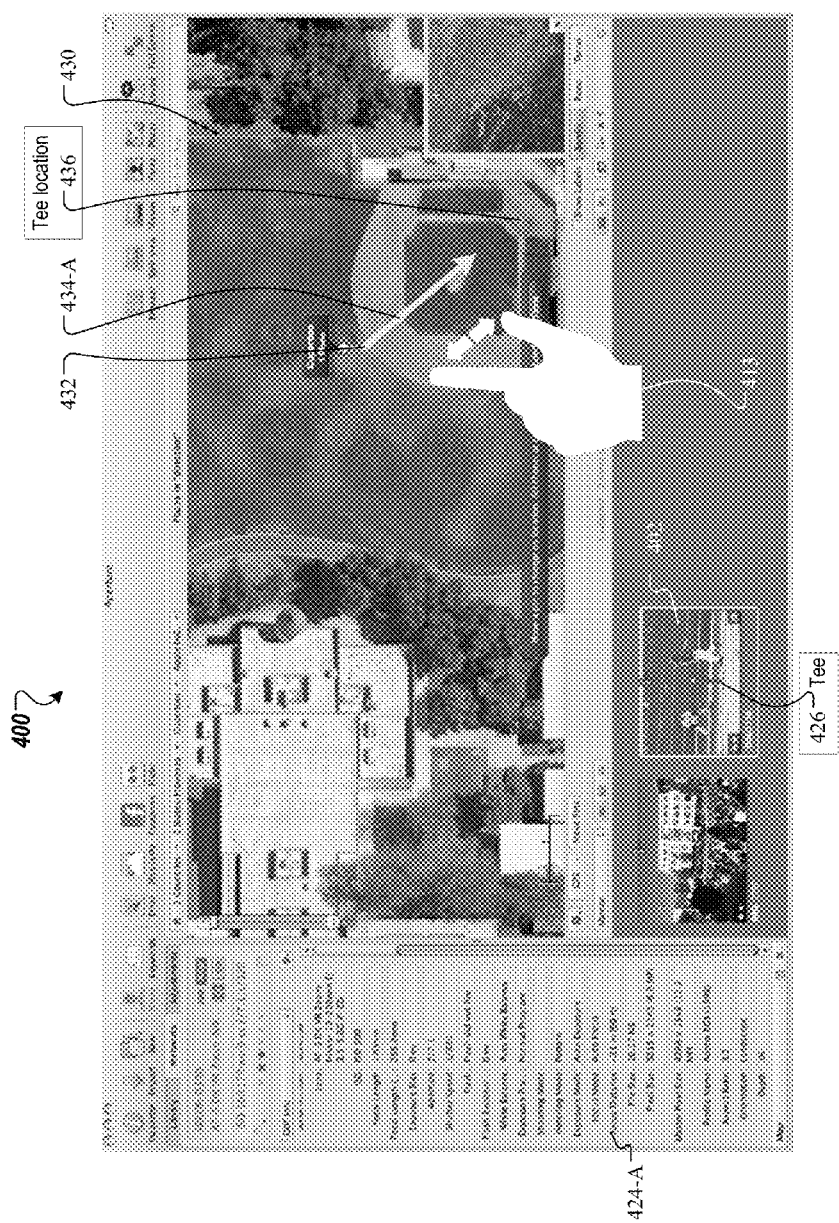
FIGS. 4A-4B show aspects of a system that is used to curate image metadata related to focal distance.
Figure 4B:
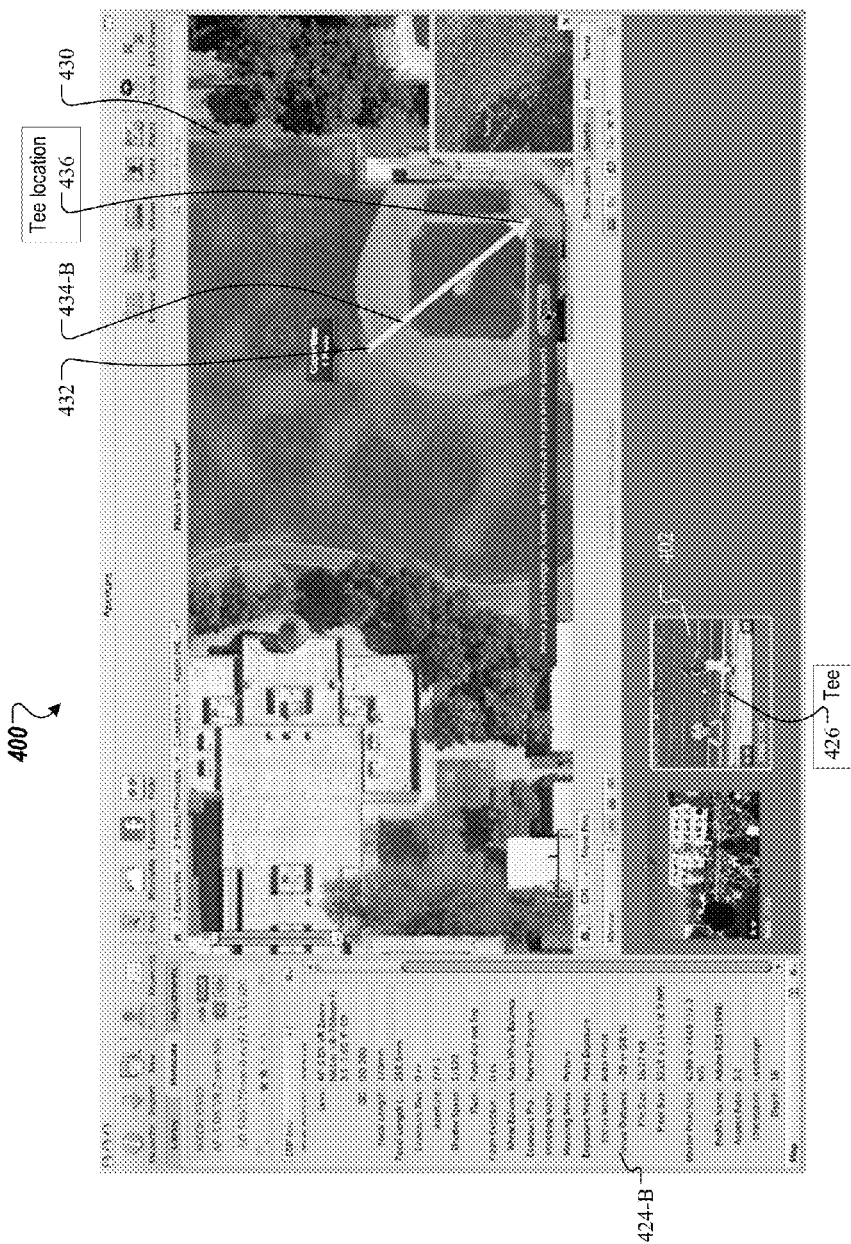

FIGS. 4A-4B show aspects of a system 400 that is used to curate image metadata related to focal distance. The system 400 can be implemented, for instance, as part of an image processing application. For example, the system 400 can correspond to an implementation of the system 100 for determining a focus distance for the camera that acquired an image given known geo-location of the camera that acquired the image and geo-location of the subject depicted in the image. As another example, the system 400 can be an extension of the system 200 described above in connection with FIGS. 2A-2D or can be operated in conjunction with the system 200. As yet another example, the system 400 can be an extension of the system 300 described above in connection with FIGS. 3A-3B or can be operated in conjunction with the system 300. Further, the system 400 can be operated in conjunction with both systems 200 and 300.

FIG. 4A shows a graphical user interface of the system 400 that displays a view of the image 402. Metadata stored along with the image 402 includes acquisition location. Information related to the acquisition location can include values of the longitude, latitude and altitude of the location of the camera that acquired the image 302. In FIG. 4A, the acquisition location is on the infield perimeter of a baseball park in Cupertino, Calif. Further in FIG. 4A, a subject depicted in the image 402 is a tee 426 used during a t-ball game. Hence, the image metadata associated with the image 402 can include an identifier of the image's subject, in this case "The tee".

The graphical user interface of the system 400 also includes a view of a map 430. The view of the map 430 corresponds to a geographical area including the acquisition location, in this case the baseball park in Cupertino, Calif. The system 400 can represent the acquisition location on the map view 430 by using a pin 432. Other graphical representations can be used to represent the acquisition location as described above in connection with FIG. 2A. In addition, the system 400 can represent on the map view 430 the location of the image's subject as a polygonal contour 436 corresponding, in the case of image 402, to the map-footprint of the tee 426. In FIG. 4A, at the zoom-level corresponding to the map view 430, the polygonal contour 436 associated with the tee 426 collapses into one point.

Additionally, the image metadata associated with the image 402 also includes an item related to the focus distance 424-A corresponding to the camera that acquired the image 402. In FIG. 4A, the focus distance 424-A is recorded to be 21 meters. The system 400 can represent the currently stored focus distance 424 by overlaying on the map view 430 an arrow 434-A pointing from the acquisition location 432 to the subject location 436, such that the default length of the arrow 434-A is proportional to the acquisition focus distance 424-A for the image 402. In this case, the focus distance information 424-A recorded by the camera must be wrong, because the arrow 434-A extends only slightly beyond the pitcher's mound, which is about half the distance to the location of the tee 436. Images can be classified based on the focus distance, for example, as close-up (near-field) if the focus distance is shorter than 3 meters, as intermediate-distant (medium-field) if the focus distance is between 3 and 25 meters and as distant (far-field) if the focus distance is longer than 25 meters. In this example, the image 402 would be incorrectly classified as an intermediate-distant (medium-field) image, based on the incorrect focus distance value of 21 m. Accordingly, if a user were to search a library of images for distant (far-field) images, the image 402 would be excluded from the search results. The technologies disclosed in this specification for fixing the incorrect focus distance 424-A stored along with the image metadata enables accurate classifications of images stored in a library, which in turn leads to accurate results of searches associated with the library.

Techniques to determine the correct focus distance based on the known acquisition location 432 and the location 436 of the image's subject 426 are described below. The system 400 can receive input from the user to correct the focus distance information 424-A associated with the image 402 that depicts the tee 426. In some implementations, a user can request to extend the arrow 434 through a multi-touch gesture, for example a reverse-pinch gesture 413. In other implementations, the user can press-and-hold on the origin of the arrow 434 by using either a touch gesture or a cursor. In some other implementations, the user may type a value for the length of the arrow 434, e.g. in box 424-A, where the typed value may be a guestimate or a result of a user's calculation. FIG. 4B shows that, in response to receiving any one of the foregoing user inputs, the system 400 can extend the length of the arrow 434 along the arrow direction from an initial length corresponding to the instance of the arrow 434-A until the arrow 434 reaches the location of the image's subject 436. In some implementations, the system 400 can highlight the point 436 corresponding to the location associated with the subject of the image 402 to alert the user that the desired length of the arrow 434-B has been reached, and hence, that the system 400 can save the correct focus distance 424-B as part of the image metadata. In FIG. 4B, the system 400 records a corrected focus distance 424-B of 60 meters. In this case, the correction of the focus distance 424-B also leads to a reclassification of the image 402 from an intermediate-distant (medium-field) image to a distant (far-field) image.

In some implementations, the system 400 can extend the arrow 434 at a rate that makes it possible for the viewer to see the tip of the arrow continuously advance across the map view 430, as long as the multi-touch gesture 413 is being applied by the user. In such implementations, the arrow 434 may be prevented from extending beyond the subject's location 436. Alternatively, the system 400 can extend the arrow 434 in one discrete step corresponding to a jump from the initial instance of the arrow 434-A to the instance of the arrow 434-B that extends from the acquisition point 432 to the location of the image's subject 436. The interactive mode described above enables the user to select as the corrected focus distance (i) the length of the instance of the arrow 434-B which extends from the acquisition point 432 to the location of the image's subject 436. Alternatively, the user can also select a different focus distance based on a shorter or longer length of the arrow 434 relative to the instance of the arrow 434-B.

When operating in automated mode, such that users are not required to perform the selection of the focus distance for the image 402, the system 400 can be configured to automatically select the focus distance to be equal to the distance between the acquisition point 432 and the location of the image's subject 436, if the relative change in focus distance is less than a predetermined threshold, e.g. 10%, 100%, etc. When the focus distance that was automatically corrected does not satisfy this criterion, the system 400 can prompt the user to perform the correction of the focus distance in interactive mode, as described above in connection with FIGS. 4A-4B.

Figure 5:
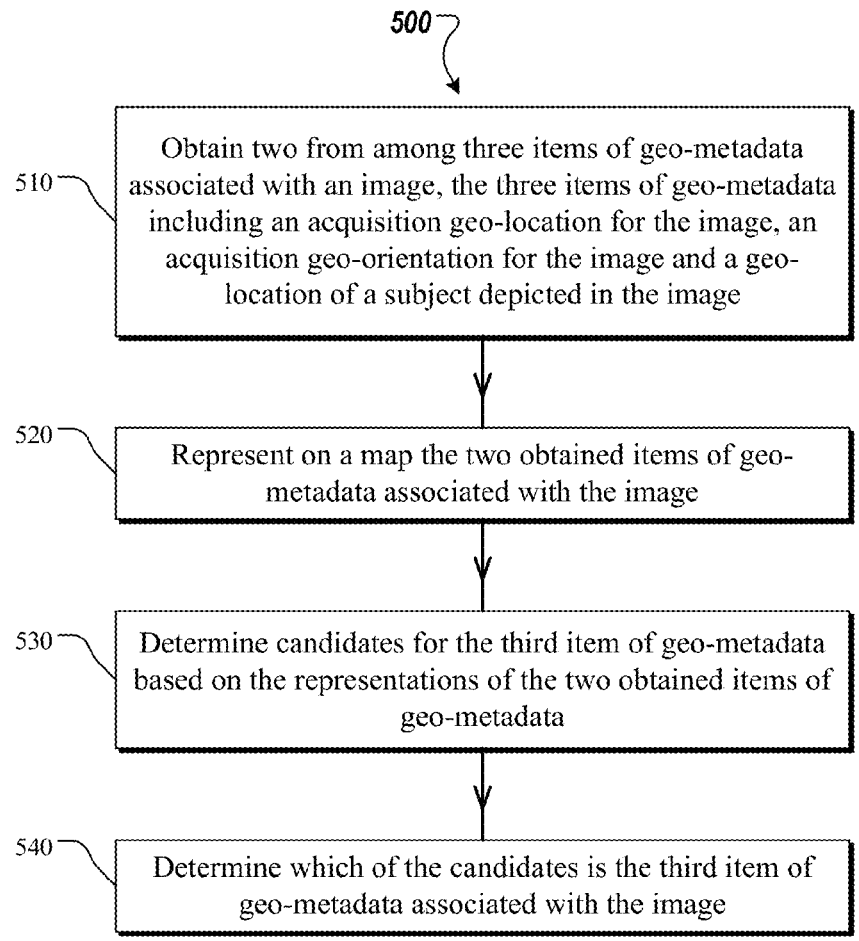
FIG. 5 shows an example of a method for curating metadata associated with an image.

FIG. 5 shows an example of a method for curating metadata associated with an image. The method 500 can be executed by one or more computers, for example, in conjunction with system 100 to curate metadata 122 associated with an image 102. Further, the method 500 can be executed by one or more computers, for example, in conjunction with system 200 for determining geo-metadata (e.g., an identifier and geo-location) associated with a subject depicted in an image 202 based on known geo-location 252 and geo-orientation 254 of the camera that acquired the image. Furthermore, the method 500 can be executed by one or more computers, for example, in conjunction with system 300 for determining acquisition geo-orientation of the camera that acquired an image 302 based on known geo-location of the camera 332 and geo-location of the subject depicted in the image 336. In addition, the method 500 can be executed by one or more computers, for example, in conjunction with system 400 for determining a focus distance for the camera that acquired an image 402 based on known geo-location of the camera that acquired the image 432 and geo-location of the subject depicted in the image 436.

At 510, two from among three items of geo-metadata associated with an image are obtained. The three items of geo-metadata are an acquisition geo-location for the image, an acquisition geo-orientation for the image and a geo-location of a subject depicted in the image. In some implementations, the two obtained items of geo-metadata associated with the image are the acquisition geo-location and the acquisition geo-orientation. In this case, the subject depicted in the image, and thus its geo-location is unknown. In other implementations, the two obtained items of geo-metadata associated with the image are the acquisition geo-location for the image and the geo-location of the subject depicted in the image. In this case, the acquisition geo-orientation for the image is unknown. In some other implementations, the two obtained items of geo-metadata associated with the image are the acquisition geo-orientation for the image and the geo-location of the subject depicted in the image. In this case, the acquisition geo-location for the image is unknown.

At 520, the two obtained items of geo-metadata associated with the image are represented on a map. For example, the obtained acquisition geo-location and geo-orientation can be represented by overlaying on the map a vector having an origin at the obtained acquisition geo-location and a direction corresponding to the obtained acquisition geo-orientation. As another example, the obtained acquisition geo-location and the geo-location of the subject depicted in the image can be represented by overlaying on the map a first point corresponding to the obtained acquisition geo-location and a polygonal contour corresponding to the obtained geo-location of the subject depicted in the image. As yet another example, the obtained geo-location of the subject depicted in the image and the acquisition geo-orientation can be represented by overlaying on the map a polygonal contour corresponding to the obtained geo-location of the subject depicted in the image and a directed line corresponding to the obtained acquisition geo-orientation that has a specified proximity to the overlaid polygonal contour. The specified proximity can be predetermined, adaptively determined or user specified.

At 530, candidates for the third item of geo-metadata are determined based on the map representations of the two obtained items of geo-metadata. For example, determining the candidates of the geo-location associated with the subject depicted in the image includes identifying along the direction of the overlaid vector one or more objectives of interest based on geo-information including polygonal contours corresponding to objectives of interest. As another example, determining the candidates of the acquisition geo-orientation includes determining an angular range between the leftmost and rightmost lines of sight from the origin of the overlaid vector to the polygonal contour associated with the image's subject. As yet another example, determining the candidates of the acquisition geo-location includes determining a positional range along the directed line corresponding to the obtained acquisition geo-orientation that has a specified proximity to the overlaid polygonal contour.

At 540, the third item of geo-metadata associated with the image is determined from among the candidates. For example, determining the subject in the image from among the one or more identified objectives of interest is performed at least in part based on predetermined criteria. In some implementations, determining the subject in the image from among the one or more identified objectives of interest can be based on user selection. In other implementations, determining the subject in the image can include at least selecting an objective from among the one or more identified objectives that is located within a specified range from the acquisition geo-location. In some other implementations, determining the subject in the image can include at least selecting an objective from among the one or more identified objectives that is located within a specified range from a focus point corresponding to the focus distance associated with the image metadata. In this example, method 500 can also include tagging the image in accordance with hierarchical geo-location information associated with the determined subject. For instance, if the determined subject is the Golden Gate Bridge, the image can be tagged as being an image of the Golden Gate Bridge, in San Francisco, Calif., United States of America, North America.

As another example, determining the acquisition orientation within the determined angular range between the leftmost and rightmost lines of sight from the map point associated with the acquisition geo-location to the polygonal contour associated with the image's subject is performed at least in part based on predetermined criteria. In some implementations, determining the acquisition orientation can be based on user selection. In other implementations, determining the acquisition orientation can include (i) overlaying on the map a vector having an origin at the obtained acquisition geo-location and pointing in a direction corresponding to a mean of the determined angular range, and (ii) generating a value of the acquisition geo-orientation as an angle of the direction of the overlaid vector. In some cases, the objective of interest can be a point of interest and the polygonal contour corresponding to the obtained geo-location of the subject depicted in the image can be one point. In such cases, a default length of the overlaid vector representing the acquisition geo-orientation can be extended from the obtained acquisition geo-location to the obtained geo-location of the subject depicted in the image, and an actual focus distance metadata can be generated as the length of the extended vector representing the acquisition geo-orientation.

As yet another example, determining the acquisition location within the determined positional range along the directed line corresponding to the obtained acquisition geo-orientation that has a specified proximity to the overlaid polygonal contour is performed at least in part based on predetermined criteria. In some implementations, determining the acquisition location can be based on user selection. In other implementations, the acquisition location can be determined as a mean of the determined positional range.

Figure 6:
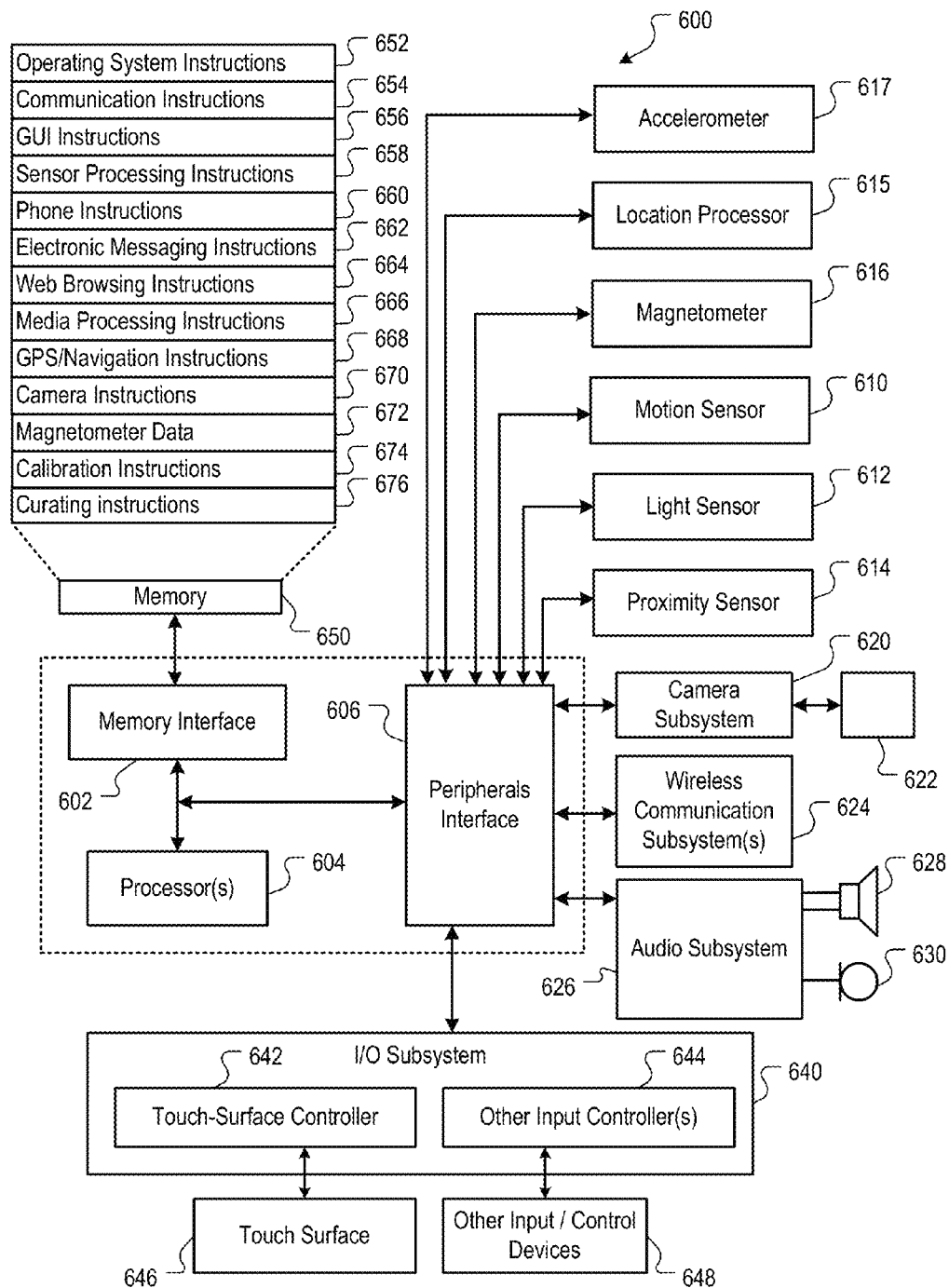
FIG. 6 is a block diagram of an example of a mobile device operated according to the technologies described above in connection with FIGS. 1-5.

FIG. 6 is a block diagram of an example of a mobile device 600 operated according to the technologies described above in connection with FIGS. 1-5. A mobile device can include memory interface 602, one or more data processors, image processors and/or processors 604, and peripherals interface 606. Memory interface 602, one or more processors 604 and/or peripherals interface 606 can be separate components or can be integrated in one or more integrated circuits. Processors 604 can include one or more application processors (APs) and one or more baseband processors (BPs). The application processors and baseband processors can be integrated in one single process chip. The various components in mobile device 600, for example, can be coupled by one or more communication buses or signal lines.

Sensors, devices, and subsystems can be coupled to peripherals interface 606 to facilitate multiple functionalities. For example, motion sensor 610, light sensor 612, and proximity sensor 614 can be coupled to peripherals interface 606 to facilitate orientation, lighting, and proximity functions of the mobile device. Location processor 615 (e.g., GPS receiver) can be connected to peripherals interface 606 to provide geopositioning. Electronic magnetometer 616 (e.g., an integrated circuit chip) can also be connected to peripherals interface 606 to provide data that can be used to determine the direction of magnetic North. Thus, electronic magnetometer 616 can be used as an electronic compass. Accelerometer 617 can also be connected to peripherals interface 606 to provide data that can be used to determine change of speed and direction of movement of the mobile device.

Camera subsystem 620 and an optical sensor 622, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which a mobile device is intended to operate. For example, a mobile device can include communication subsystems 624 designed to operate over a GSM network, a GPRS network, an EDGE network, a Wi-Fi or WiMax network, and a Bluetooth network. In particular, the wireless communication subsystems 624 can include hosting protocols such that the mobile device can be configured as a base station for other wireless devices.

Audio subsystem 626 can be coupled to a speaker 628 and a microphone 630 to facilitate voice-enabled functions, such as voice recognition, voice replication, digital recording, and telephony functions.

I/O subsystem 640 can include touch surface controller 642 and/or other input controller(s) 644. Touch-surface controller 642 can be coupled to a touch surface 646 (e.g., a touch screen or touch pad). Touch surface 646 and touch surface controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 646.

Other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of speaker 628 and/or microphone 630.

In some implementation, a pressing of the button for a first duration may disengage a lock of the touch surface 646; and a pressing of the button for a second duration that is longer than the first duration may turn power to mobile device 600 on or off. The user may be able to customize a functionality of one or more of the buttons. The touch surface 646 can, for example, also be used to implement virtual or soft buttons and/or a keyboard, such as a soft keyboard on a touch-sensitive display.

In some implementations, mobile device 600 can present recorded audio and/or video files, such as MP3, AAC, and MPEG files. In some implementations, mobile device 600 can include the functionality of an MP3 player, such as an iPod™. Mobile device 600 may, therefore, include a pin connector that is compatible with the iPod. Other input/output and control devices can also be used.

Memory interface 602 can be coupled to memory 650. Memory 650 can include high-speed random access memory and/or non-volatile memory, such as one or more magnetic disk storage devices, one or more optical storage devices, and/or flash memory (e.g., NAND, NOR). Memory 650 can store operating system 652, such as Darwin, RTXC, LINUX, UNIX, OS X, WINDOWS, or an embedded operating system such as VxWorks. Operating system 652 may include instructions for handling basic system services and for performing hardware dependent tasks. In some implementations, operating system 652 can include a kernel (e.g., UNIX kernel).

Memory 650 may also store communication instructions 654 to facilitate communicating with one or more additional devices, one or more computers and/or one or more servers. Memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate Global Navigation Satellite System (GNSS) (e.g., GPS) and navigation-related processes and instructions; camera instructions 670 to facilitate camera-related processes and functions; magnetometer data 672 and calibration instructions 674 to facilitate magnetometer calibration. The memory 650 may also store other software instructions (not shown), such as security instructions, web video instructions to facilitate web video-related processes and functions, and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 650. Memory 650 can include curating instructions 676 that can include curating functions, and other related functions described with respect to FIGS. 1-5.

Each of the above identified instructions and applications can correspond to a set of instructions for performing one or more functions described above. These instructions need not be implemented as separate software programs, procedures, or modules. Memory 650 can include additional instructions or fewer instructions. Furthermore, various functions of the mobile device may be implemented in hardware and/or in software, including in one or more signal processing and/or application specific integrated circuits.

Figure 7:
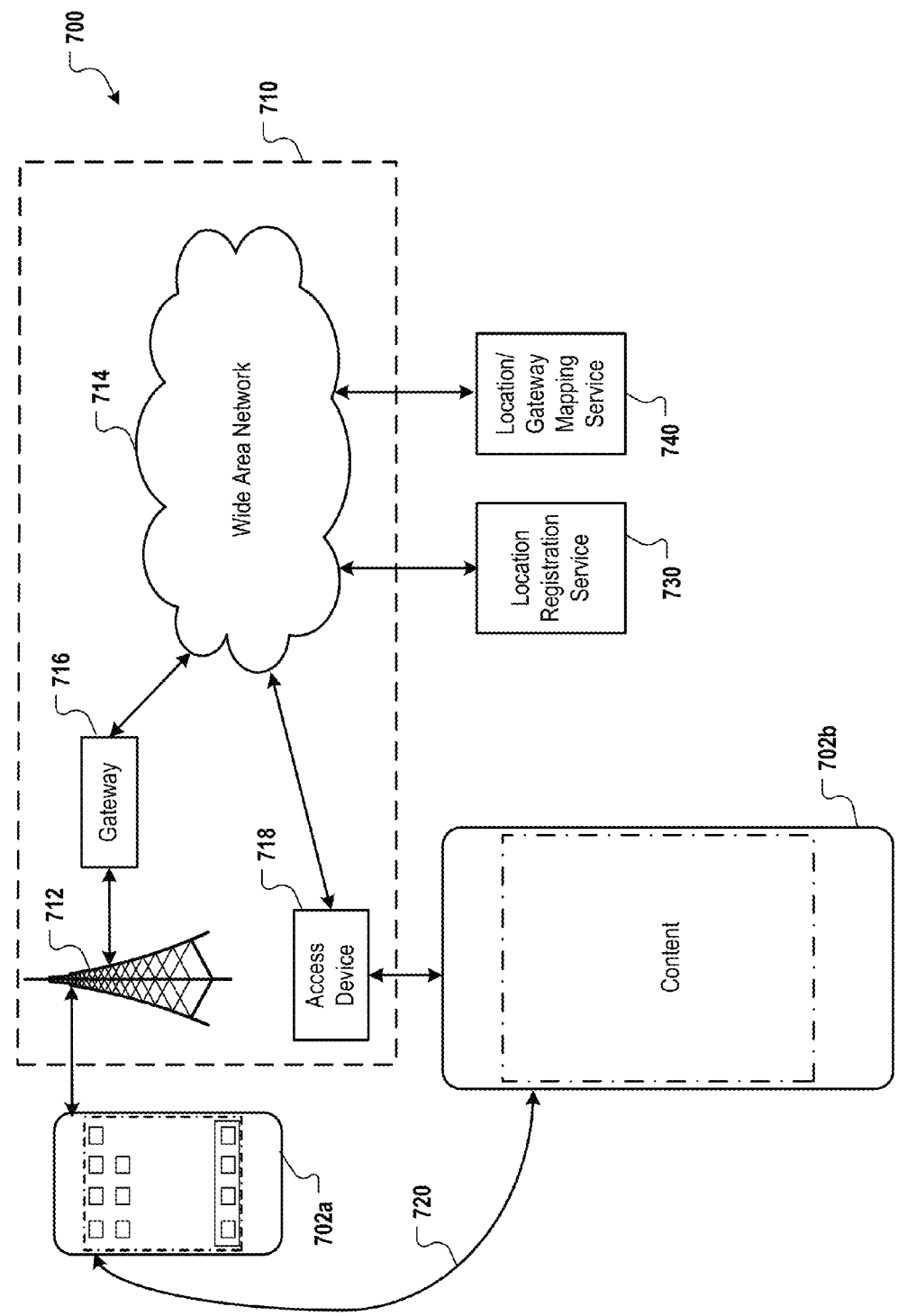
FIG. 7 is a block diagram of an example of a network operating environment for mobile devices operated according to the technologies described above in connection with FIGS. 1-5.

FIG. 7 is a block diagram of an example of a network operating environment 700 for mobile devices operated according to the technologies described above in connection with FIGS. 1-5. Mobile devices 702a and 702b can, for example, communicate over one or more wired and/or wireless networks 710 in data communication. For example, a wireless network 712, e.g., a cellular network, can communicate with a wide area network (WAN) 714, such as the Internet, by use of a gateway 716. Likewise, an access device 718, such as an 802.11g wireless access device, can provide communication access to the wide area network 714.

In some implementations, both voice and data communications can be established over wireless network 712 and the access device 718. For example, mobile device 702a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 712, gateway 716, and wide area network 714 (e.g., using Transmission Control Protocol/Internet Protocol (TCP/IP) or User Datagram Protocol (UDP)). Likewise, in some implementations, the mobile device 702b can place and receive phone calls, send and receive e-mail messages, and retrieve electronic documents over the access device 718 and the wide area network 714. In some implementations, mobile device 702a or 702b can be physically connected to the access device 718 using one or more cables and the access device 718 can be a personal computer. In this configuration, mobile device 702a or 702b can be referred to as a "tethered" device.

Mobile devices 702a and 702b can also establish communications by other means. For example, wireless device 702a can communicate with other wireless devices, e.g., other mobile devices 702a or 702b, cell phones, etc., over the wireless network 712. Likewise, mobile devices 702a and 702b can establish peer-to-peer communications 720, e.g., a personal area network, by use of one or more communication subsystems, such as the Bluetooth™ communication devices. Other communication protocols and topologies can also be implemented.

The mobile device 702a or 702b can, for example, communicate with one or more services 730 and 740 over the one or more wired and/or wireless networks. For example, one or more location registration services 730 can be used to associate application programs with geographic regions. The application programs that have been associated with one or more geographic regions can be provided for download to mobile devices 702a and 702b.

Location gateway mapping service 740 can determine one or more identifiers of wireless access gateways associated with a particular geographic region, and provide the one or more identifiers to mobile devices 702a and 702b for registration in association with a baseband subsystem.

Mobile device 702a or 702b can also access other data and content over the one or more wired and/or wireless networks. For example, content publishers, such as news sites, Really Simple Syndication (RSS) feeds, web sites, blogs, social networking sites, developer networks, etc., can be accessed by mobile device 702a or 702b. Such access can be provided by invocation of a web browsing function or application (e.g., a browser) in response to a user touching, for example, a Web object.

Implementations of the subject matter and the functional operations described in this specification can be configured in digital electronic circuitry, in tangibly-embodied computer software or firmware, in computer hardware, including the structures disclosed in this specification and their structural equivalents, or in combinations of one or more of them. Implementations of the subject matter described in this specification can be configured as one or more computer programs, i.e., one or more modules of computer program instructions encoded on a tangible nonvolatile program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be configured on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be configured in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be configured in combination in a single implementation. Conversely, various features that are described in the context of a single implementation can also be configured in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more processes executing on a computer system, the method comprising:
    obtaining, from geo-metadata associated with an image, an acquisition geo-location for the image and, an acquisition geo-orientation for the image;
    representing on a map the acquisition geo-location and the acquisition geo-orientation;
    identifying one or more objects based, at least in part, on the acquisition geo-location and the acquisition geo-orientation, wherein the one or more objects represent one or more candidates of a subject depicted in the image;
    determining, for each of the one or more candidates, a distance between a focus point of the image and a geo-location associated with each of the one or more candidates;
    identifying, based on the determining, a primary candidate, the primary candidate positioned at the distance nearest the focus point;
    identifying the primary candidate as the subject of the image; and
    representing the subject on the map.

2. The method of claim 1, further comprising:
    overlaying on the map a vector having an origin at the obtained acquisition geo-location and a direction corresponding to the obtained acquisition geo-orientation; and
    identifying the one or more candidates positioned along the direction of the vector based on geo-information including polygonal contours corresponding to the one or more candidates.

3. The method of claim 2, wherein identifying the primary candidate as the subject of the image comprises:
    determining which of the one or more identified candidates is the subject based on a user selection.

4. The method of claim 2, wherein identifying the primary candidate as the subject of the image comprises:
    selecting a candidate from among the one or more identified candidates that is located within a specified range of the acquisition geo-location.

5. The method of claim 2, further comprising tagging the image in accordance with hierarchical geo-location information associated with the determined subject.

6. The method of claim 2, further comprising generating metadata for a focus distance, wherein the focus distance is substantially equal to a length of the overlaid vector representing the acquisition geo-orientation.

7. The method of claim 2, wherein identifying the one or more candidates positioned along the direction of the vector further comprises:
receiving a user request to identify an object depicted in the image along the direction of the vector;
extending, in response to the received user request, a length of the vector; and
identifying the object upon the extended vector reaching a polygonal contour of the object.

8. The method of claim 7, wherein reaching the polygonal contour occurs when the extended vector is separated from the polygonal contour by less than a predetermined distance.

9. The method of claim 2, where the image comprises a frame included in a sequence of video frames, and the method further comprises associating the subject with the sequence of video frames.

10. The method of claim 9, further comprising:
obtaining an acquisition geo-location and an acquisition geo-orientation of an other frame of the sequence of video frames;
representing on the map the obtained acquisition geo-location and geo-orientation of the other frame, at least in part, by overlaying on the map an other vector having an origin at the obtained acquisition geo-location of the other frame and a direction corresponding to the obtained acquisition geo-orientation of the other frame;
identifying along the direction of the other vector one or more other candidates of a subject depicted in the image based, at least in part, on geo-information including polygonal contours corresponding to the one or more other candidates;
determining, for each of the one or more other candidates, a distance between a focus point of the image and a geo-location associated with each of the one or more other candidates;
identifying, based on the determining, an other primary candidate, the other primary candidate positioned at the distance nearest the focus point;
identifying the other primary candidate as the subject of the other frame; and
associating the subject of the other frame with the sequence of video frames.

11. A non-transitory computer readable medium encoded with a computer program, the program comprising instructions that when executed by a data processing apparatus cause the data processing apparatus to:
obtain from geo-metadata associated with an image, an acquisition geo-location for the image and an acquisition geo-orientation for the image;
represent on a map the acquisition geo-location and the acquisition geo-orientation;
determine one or more objects based, at least in part, on the acquisition geo-location and the acquisition geo-orientation, wherein the one or more objects represent one or more candidates of a subject depicted in the image;
determine, for each of the one or more candidates, a distance between a focus point of the image and a geo-location associated with each of the one or more candidates;
identify, based on the determination, a primary candidate, the primary candidate positioned at the distance nearest the focus point;
identify the primary candidate as the subject of the image; and
represent the subject on the map.

12. The non-transitory computer readable medium of claim 11, wherein the instructions to cause the data processing apparatus to represent on a map the acquisition geo-location and the acquisition geo-orientation comprise instructions to cause the data processing apparatus to:
overlay on the map a vector having an origin at the obtained acquisition geo-location and a direction corresponding to the obtained acquisition geo-orientation, and
wherein the instructions to cause the data processing apparatus to determine one or more candidates for a geo-location of a subject comprise instructions to cause the data processing apparatus to identify the one or more candidates positioned along the direction of the vector based on geo-information including polygonal contours corresponding to the one or more candidates.

13. A system comprising:
at least one display device;
at least one processor; and
storage configured to store instructions that are operable, when executed by the processor, to cause the system to perform operations comprising:
obtaining from geo-metadata associated with an image, an acquisition geo-location for the image and an acquisition geo-orientation for the image;
representing on a map the acquisition geo-location and the acquisition geo-orientation;
determining one or more objects based, at least in part, on the acquisition geo-location and the acquisition geo-orientation, wherein the one or more objects represent one or more candidates of a subject depicted in the image;
determining, for each of the one or more candidates, a distance between a focus point of the image and a geo-location associated with each of the one or more candidates;
identifying, based on the determining, a primary candidate, the primary candidate positioned at the distance nearest the focus point;
identifying the primary candidate as the subject of the image; and
representing the subject on the map.

14. The system of claim 13, further comprising:
overlaying on the map a vector having an origin at the obtained acquisition geo-location and a direction corresponding to the obtained acquisition geo-orientation; and
identifying the one or more candidates positioned along the direction of the vector based, at least in part, on geo-information including polygonal contours corresponding to the one or more candidates.

15. A non-transitory computer readable medium encoded with a computer program, the program comprising instructions that when executed by a data processing apparatus cause the data processing apparatus to:
obtain from geo-metadata associated with an image an acquisition geo-location for the image and a geo-location of a subject depicted in the image, wherein the subject is a point of interest in the image;
represent on a map the acquisition geo-location and the geo-location of the subject;

overlay on the map a first indicator corresponding to the acquisition geo-location and a polygonal contour corresponding to the geo-location of the subject;

determine an angular range between the acquisition geo-location and boundaries of the polygonal contour;

overlay on the map a vector having an origin at the obtained acquisition geo-location and a length representative of a focus distance associated with the image;

determine, based at least in part on the angular range, one or more candidates for an acquisition geo-orientation;

determine from the one or more candidates the acquisition geo-orientation; and represent the determined acquisition geo-orientation on the map.

16. The non-transitory computer readable medium of claim 15, wherein the instructions to cause the data processing apparatus to determine from the one or more candidates the acquisition geo-orientation comprise instructions to cause the data processing apparatus to:

receive a request to orient the vector in a direction within the angular range;

orient the vector in the requested direction; and generate a value of the acquisition geo-orientation based, at least in part, on an angle of the oriented vector.

17. A non-transitory computer readable medium encoded with a computer program, the program comprising instructions that when executed by a data processing apparatus cause the data processing apparatus to:

obtain from geo-metadata associated with an image an acquisition geo-orientation for the image and a geo-location of a subject depicted in the image, wherein the subject is a point of interest in the image;

represent the acquisition geo-orientation and the geo-location of the subject on a map;

determine one or more candidates for an acquisition geo-location based on the acquisition geo-orientation and the geo-location of the subject depicted in the image;

determine from the one or more candidates the acquisition geo-location based, at least in part, on a point along the acquisition geo-orientation at a distance from the geo-location of the subject that is substantially equal to a focus distance associated with the image; and represent the acquisition geo-location on the map.

* * * * *